United States Patent
Liu

(10) Patent No.: US 8,861,583 B2
(45) Date of Patent: Oct. 14, 2014

(54) APPARATUS AND METHODS FOR EQUALIZER ADAPTATION

(71) Applicant: Altera Corporation, San Jose, CA (US)

(72) Inventor: Wing Liu, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 34 days.

(21) Appl. No.: 13/715,629

(22) Filed: Dec. 14, 2012

(65) Prior Publication Data

US 2014/0169439 A1  Jun. 19, 2014

(51) Int. Cl.
*H03H 7/30* (2006.01)
*H04L 25/03* (2006.01)

(52) U.S. Cl.
CPC .............................. *H04L 25/03885* (2013.01)
USPC ........... 375/233; 375/229; 375/230; 375/232; 375/346

(58) Field of Classification Search
CPC ................... H04L 25/03114; H04L 25/03343; H04L 25/03681; H04L 25/03038; H04L 25/061; H04L 25/03611; H04L 25/03057; H04L 25/03783; H04L 25/03356; H04L 25/03885; H04L 25/03745; H04L 7/0025; H04L 7/0029; H04L 7/033; H04L 7/0054
USPC .......................... 375/229, 230, 232, 233, 346
See application file for complete search history.

(56) References Cited

U.S. PATENT DOCUMENTS

| | | | |
|---|---|---|---|
| 6,118,815 A | 9/2000 | Hirth et al. | |
| 6,192,071 B1 | 2/2001 | Hirth et al. | |
| 6,222,876 B1 | 4/2001 | Hirth et al. | |
| 6,956,914 B2 * | 10/2005 | Sivadas et al. | 375/345 |
| 6,980,592 B1 | 12/2005 | Rambaud et al. | |
| 8,111,792 B2 | 2/2012 | Ou | |
| 8,175,143 B1 * | 5/2012 | Wong et al. | 375/232 |
| 8,548,110 B2 * | 10/2013 | Lin et al. | 375/355 |
| 2006/0088089 A1 * | 4/2006 | Gondi et al. | 375/232 |
| 2007/0280389 A1 * | 12/2007 | Hidaka | 375/350 |
| 2010/0246657 A1 | 9/2010 | Ou | |

* cited by examiner

*Primary Examiner* — Leon Flores
(74) *Attorney, Agent, or Firm* — Okamoto & Benedicto LLP

(57) ABSTRACT

One embodiment relates to an equalizer circuit for a data link. The equalizer circuit including a continuous-time linear equalizer, a first circuit loop, and a second circuit loop. The continuous-time linear equalizer receives a received signal and outputs an equalized signal. The first circuit loop determines a first average signal amplitude. The first average signal amplitude may be an average signal amplitude of the equalized signal. The second circuit loop a second average signal amplitude. The second average signal amplitude may be an average signal amplitude of a high-frequency portion of the equalized signal. Other embodiments and features are also disclosed.

16 Claims, 21 Drawing Sheets

US 8,861,583 B2

APPARATUS AND METHODS FOR EQUALIZER ADAPTATION

BACKGROUND

1. Technical Field

The present invention relates generally to data communications. More particularly, the present invention relates to equalization circuitry for data communications.

2. Description of the Background Art

High-speed data links are used to communicate data between devices in a system. Serial interface protocols have been developed at increasingly fast data rates for such high-speed links. Examples of industry-standard protocols for serial interfaces include PCI Express® (Peripheral Component Interconnect Express), XAUI (X Attachment Unit Interface), sRIO (serial Rapid IO), and others.

Conventional equalization techniques include continuous time linear equalization (CTLE). As the operating speed of the high-speed data links increases to rates which are tens of gigabits per second (Gbps) or more, sophisticated equalization schemes, such as decision feedback equalization (DFE), has become more commonly used in order to compensate for high-frequency signal loss. However, such complex techniques typically require circuitry that consumes a large amount of power and may be less flexible in terms of meeting requirements for various types of applications.

It is highly desirable to improve data communications. In particular, it is highly desirable to improve equalization techniques to support high-speed data communications.

SUMMARY

One embodiment relates to an equalizer circuit for a data link. The equalizer circuit including a continuous-time linear equalizer, a first circuit loop, and a second circuit loop. The continuous-time linear equalizer receives a received signal and outputs an equalized signal. The first circuit loop determines a first average signal amplitude. The first average signal amplitude may be an average signal amplitude of the equalized signal. The second circuit loop a second average signal amplitude. The second average signal amplitude may be an average signal amplitude of a high-frequency portion of the equalized signal.

Another embodiment relates to an equalizer circuit for a data link. The equalizer circuit includes a continuous-time linear equalizer for receiving a received signal and outputting an equalized signal and further includes a data sense-amplifier latch which latches the equalized signal using a clock signal and outputs a data signal. The equalizer circuit further includes an error sense-amplifier latch which compares amplitudes between the equalized signal to a reference voltage signal and which outputs an error signal in a positive difference state if the amplitude of the equalized signal is larger than the amplitude of the reference voltage signal and otherwise outputs the error signal in a negative difference state. A first control circuit receives the equalized signal and determines a first average signal amplitude to control the reference voltage signal. A second control circuit receives the equalized signal and determines a second average signal amplitude to control the continuous-time linear equalizer. The first average signal amplitude comprises an average signal amplitude of a first set of data patterns in the equalized signal, and the second average signal amplitude comprises an average signal amplitude of a second set of data patterns in the equalized signal.

Another embodiment relates to a method of receiver equalization. A received signal is received by a continuous-time linear equalizer which outputs an equalized signal. The equalized signal is latched by a data sense-amplifier latch which outputs a data signal. The amplitudes between the equalized signal to a reference voltage signal are compared by an error sense-amplifier latch which outputs an error signal in a positive difference state if the amplitude of the equalized signal is larger than the amplitude of the reference voltage signal and otherwise outputs the error signal in a negative difference state. A determination is made of a first average signal amplitude to control the reference voltage signal. A determination is made of a second average signal amplitude to control the continuous-time linear equalizer. The first average signal amplitude comprises an average signal amplitude of a first set of data patterns in the equalized signal, and the second average signal amplitude comprises an average signal amplitude of a second set of data patterns in the equalized signal.

Other embodiments and features are also disclosed.

DETAILED DESCRIPTION

The present disclosure provides a digital adaptation scheme for equalization which may be implemented with minimal additional hardware circuitry. As described below, the performance of the scheme may depend on a data pattern or patterns chosen to be recognized by a high-frequency data pattern recognizer circuit. The adaption scheme may be implemented with CTLE or with both CTLE and DFE. The equalization strength between CTLE and DFE may be partitioned by adjusting their loop counters.

Figure 1:
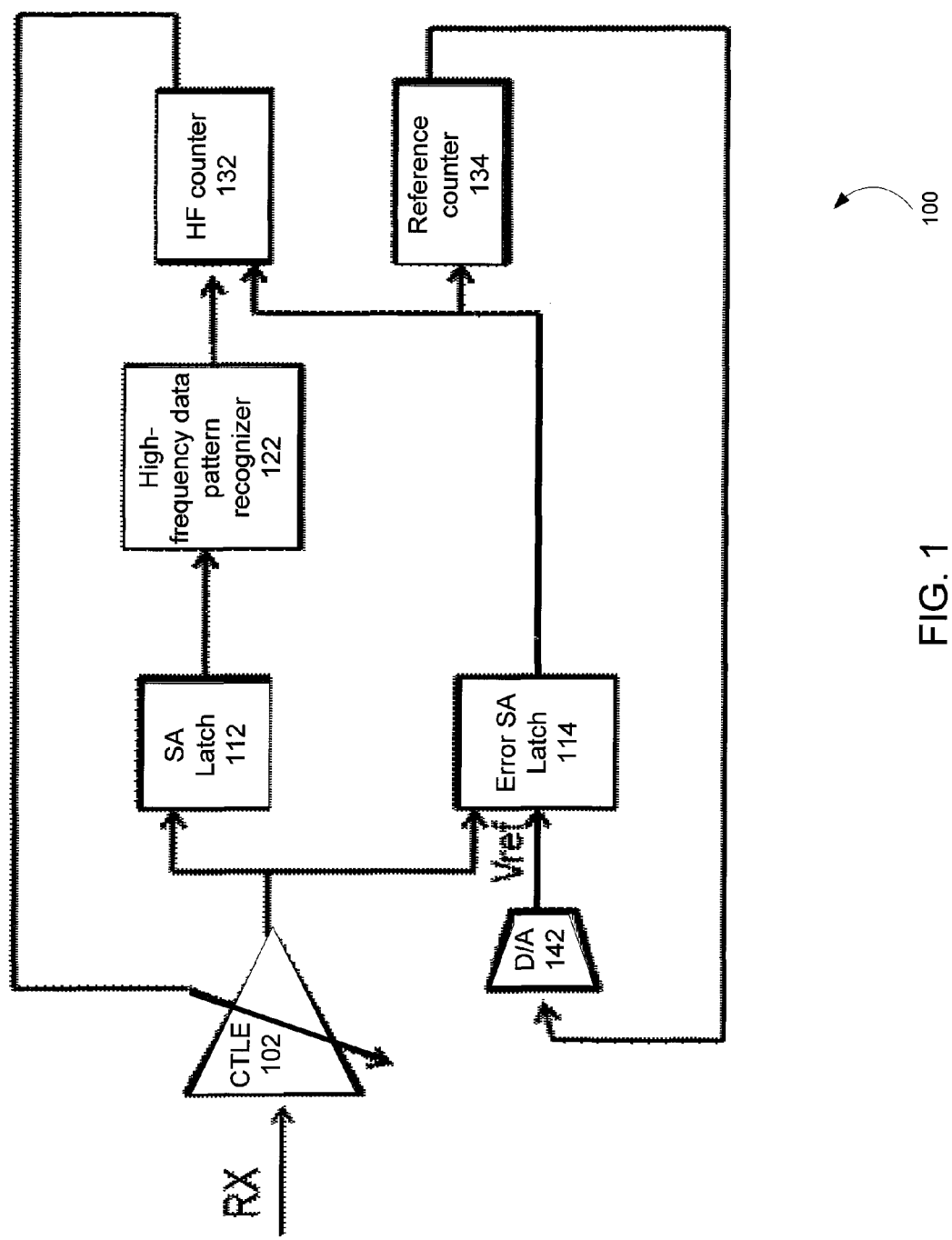
FIG. 1 is a block diagram of a circuit for equalizer adaptation in accordance with an embodiment of the invention.
Figure 2:
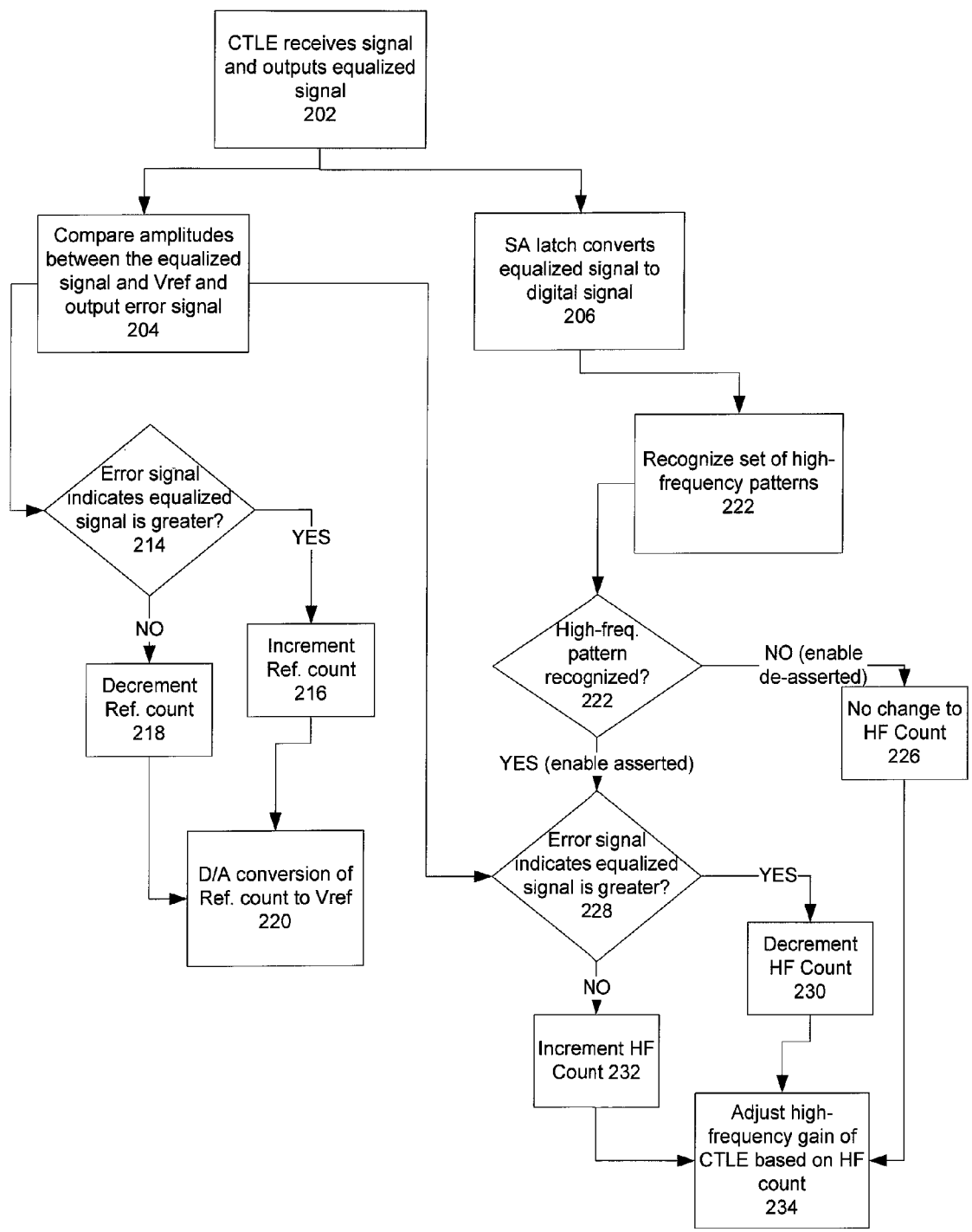
FIG. 2 is a flow chart of an equalizer adaptation method using the circuit of FIG. 1 in accordance with an embodiment of the invention.

FIG. 1 is a block diagram of a circuit 100 for equalizer adaptation in accordance with an embodiment of the invention, and FIG. 2 is a flow chart of an equalizer adaptation method 200 using the circuit 100 of FIG. 1. As shown in FIG. 1, the equalizer adaptation circuit 100 includes a continuous-time linear equalization (CTLE) circuit 102, a sense-amplifier (SA) latch 112, an error SA latch 114, a high-frequency data pattern recognizer 122, a high-frequency (HF) counter 132, a reference counter 134, and a digital-to-analog converter (D/A) 142.

Per block 202 of FIG. 2, the CTLE circuit 102 may receive a differential signal (the received or RX signal) from a serial communication channel, and the CTLE circuit 102 may apply equalization to the RX signal and output an equalized signal to the SA latch 112 and the error SA latch 114. The equalized signal may also be a differential signal. Note that, in accordance with an embodiment of the invention, the CTLE circuit 102 is controlled digitally.

Per block 204 of FIG. 2, the error SA latch 114 may function as a comparator circuit which compares the amplitude of the equalized signal output by the CTLE circuit 102 against the amplitude of a reference voltage (Vref) signal output by the D/A converter 142. If the equalized signal is a differential signal, then the Vref signal is also a differential signal. The output of the error SA latch 114 is a digital signal that indicates the sign bit of the comparison result. For example, if the amplitude of the equalized signal is greater than the amplitude of Vref, then the error SA latch 114 may output a logical one (indicating that the amplitude of the equalized signal is greater); otherwise, the error SA latch 114 may output a logical zero (indicating that the amplitude of the equalized signal is not greater). The digital output of the error SA latch 114 is provided to the HF counter 132 and the reference counter 134.

Per block 214 of FIG. 2, if the error signal output by the error SA latch 114 indicates that the amplitude of the equalized signal is greater than the amplitude of Vref, then the reference counter 134 may be incremented by one, as shown in block 216. Otherwise, if the error signal indicates that the amplitude of the equalized signal is not greater than the amplitude of Vref, then the reference counter 134 may be decremented by one, as shown in block 218.

In either case, per block 220, the D/A converter 142 converts the digital output from the reference counter 134 to the analog reference voltage (Vref). Vref is output from the D/A converter 142 to the error SA latch 114. Thus, a first circuit loop is completed. This loop effectively averages the amplitude of the equalized signal to generate Vref. In other words, Vref in FIG. 1 is the average signal amplitude of the equalized signal.

Per block 206 of FIG. 2, the SA latch 112 effectively "slices" the equalized signal into a logical one or a logical zero depending on whether the input signal is larger or smaller than a threshold. In other words, the SA latch 112 converts the equalized signal into a digital signal. The output of the SA latch 112 is a digital signal that is provided to the HF data pattern recognizer 122.

Per block 222, the HF data pattern recognizer 122 may be configured to recognize one or more "oscillated" data patterns (the designated high-frequency data patterns). An example circuit 700 for a HF data pattern recognizer 122 is described below in relation to FIG. 7.

When a designated high-frequency data pattern is not recognized, the HF data pattern recognizer 122 may de-assert an enable signal to the HF counter 132 (see arrow between block 222 and 226). In this case, no change is made to the HF count per block 226. In other words, the value of the HF counter 132 remains the same.

On the other hand, when a designated high-frequency data pattern is recognized, the HF data pattern recognizer 122 may assert an enable signal to the HF counter 132 (see arrow between block 222 and 228). In this case, a determination may be made, per block 228, as to whether the error signal output by the error SA latch 114 indicates that the amplitude of the equalized signal is greater than the amplitude of Vref. If the error signal output by the error SA latch 114 indicates that the amplitude of the equalized signal is greater than the amplitude of Vref during a recognized high-frequency pattern, then the HF count may be decremented by one, as shown in block 230. Otherwise, if the error signal indicates that the amplitude of the equalized signal is not greater than the amplitude of Vref, then the HF count may be incremented by one, as shown in block 232.

In either case, per block 234, the HF counter 132 outputs the HF count to directly drive a digital control input of the CTLE circuit 102 which controls the high-frequency gain applied by the CTLE circuit 102. Per block 234, the CTLE circuit 102 adjusts its high-frequency gain based on the HF count. Thus, a second circuit loop is completed. This loop effectively averages the amplitude of a selected high-frequency portion of the equalized signal. This average amplitude (represented by the HF count) is used to adjust the high-frequency gain of the CTLE circuit 102.

Figure 3:
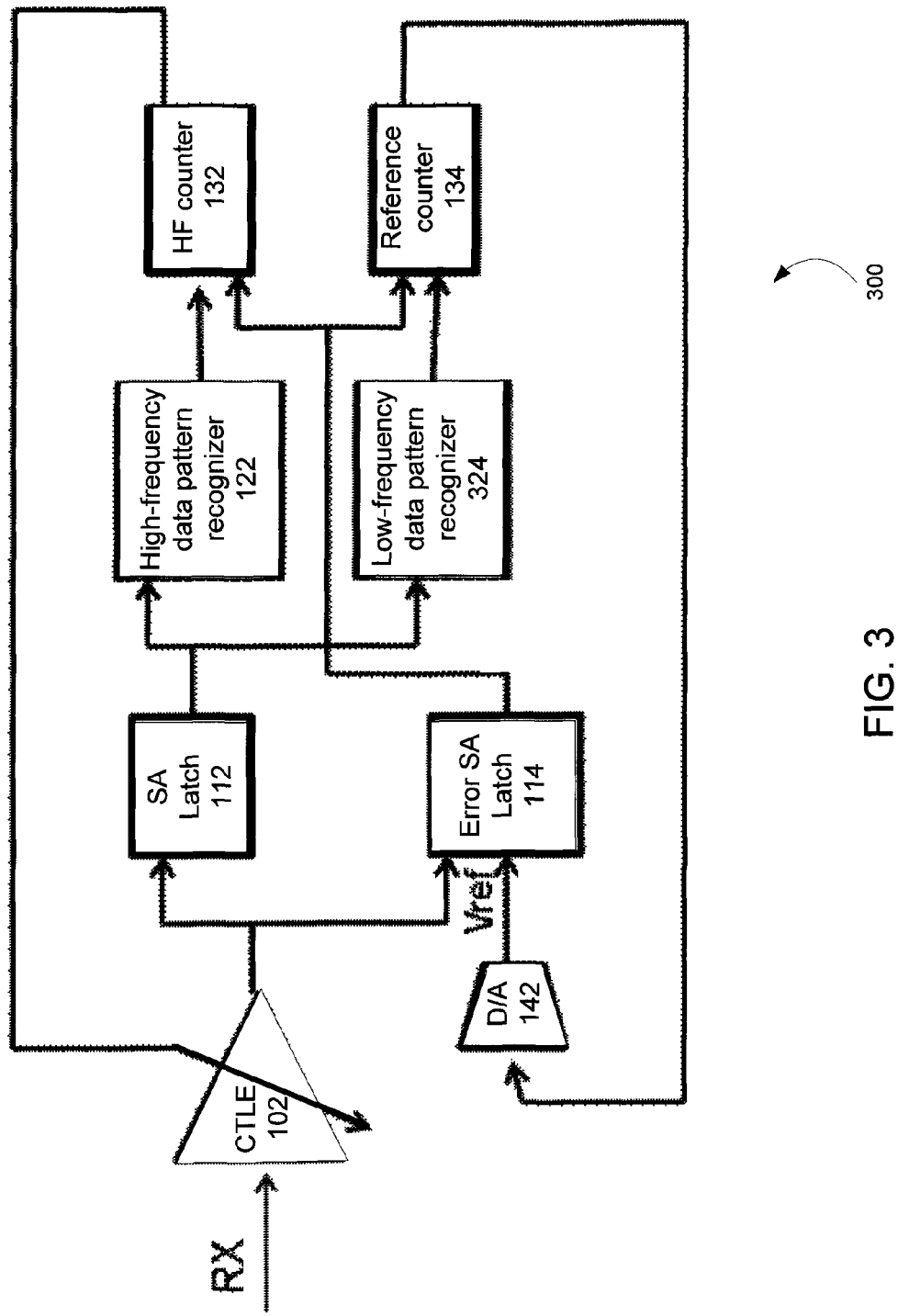
FIG. 3 is a block diagram of an alternate circuit for equalizer adaptation in accordance with an embodiment of the invention.
Figure 4:
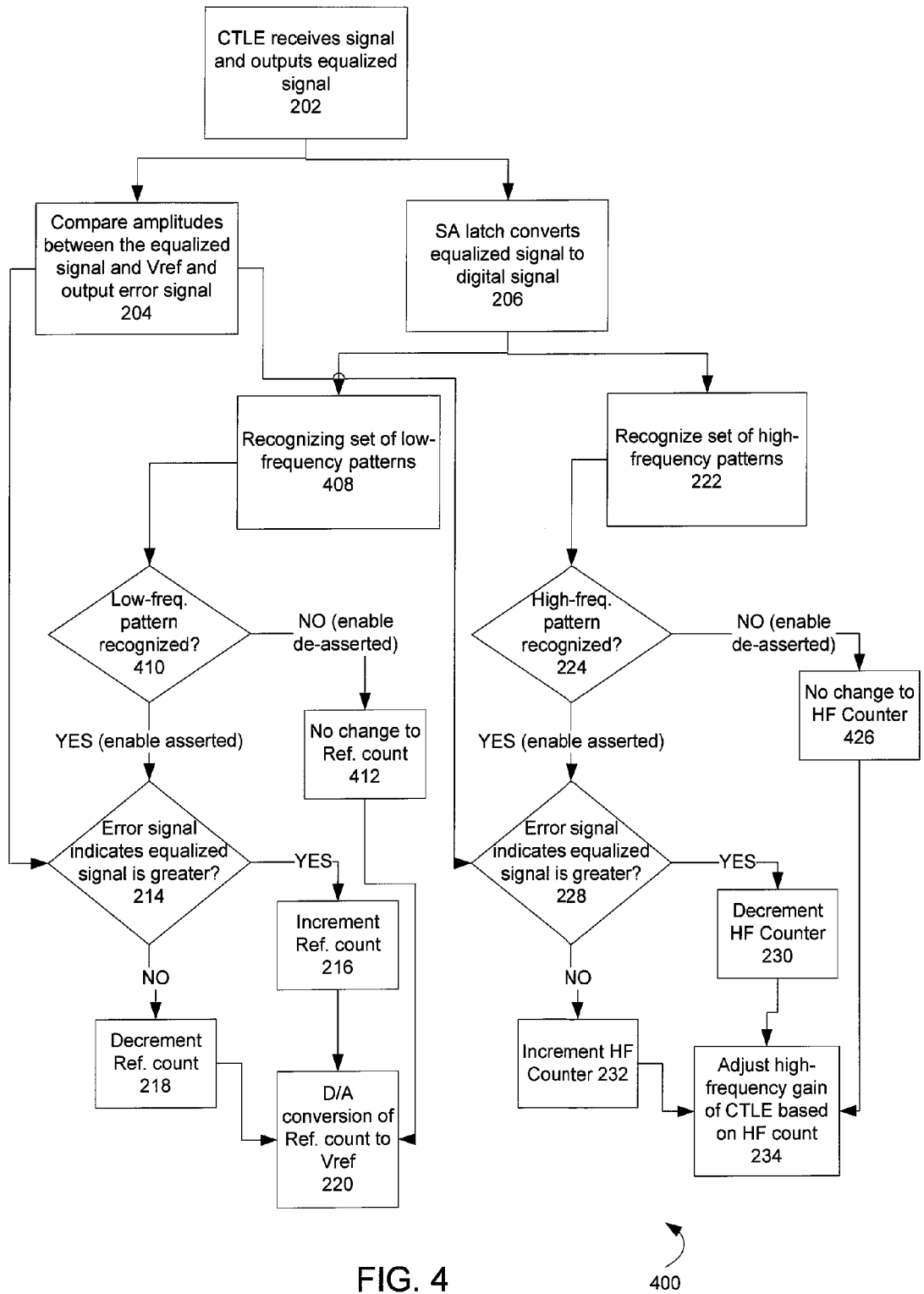
FIG. 4 is a flow chart of an equalizer adaptation method using the circuit of FIG. 3 in accordance with an embodiment of the invention.

FIG. 3 is a block diagram of an alternate circuit 300 for equalizer adaptation in accordance with an embodiment of the invention, and FIG. 4 is a flow chart of an equalizer adaptation method 400 using the circuit 300 of FIG. 3. Similar to the circuit 100 of FIG. 1, the circuit 300 of FIG. 3 includes the CTLE circuit 102, the SA latch 112, the error SA latch 114, the high-frequency data pattern recognizer 122, the HF counter 132, the Reference counter 134, and the digital-to-analog converter (D/A) 142. Similar to the method 200 of FIG. 2, the method 400 of FIG. 4 includes blocks 202, 204, 206, 214, 216, 218, 220, 222, 224, 226, 228, 230, 232 and 234.

In addition, the circuit 300 of FIG. 3 includes a low-frequency (LF) data pattern recognizer 324 which is used to enable/disable the Reference counter 134. The enablement/disablement of the Ref. counter 134 is described below in relation to blocks 408 through 412 in FIG. 4.

The LF data pattern recognizer 324 receives the digital signal from the SA latch 112. Per block 408, the LF data pattern recognizer 324 recognizes one or more long sequential bit patterns (the designated low-frequency data patterns) in the digital signal.

When a designated low-frequency data pattern is not recognized, the LF data pattern recognizer 324 may de-assert an enable signal to the Ref. counter 134 (see arrow between block 410 and 412). In this case, no change is made to the Reference count per block 412. In other words, the value of the Reference counter 134 remains the same.

On the other hand, when a designated low-frequency data pattern is recognized, the LF data pattern recognizer 324 may assert an enable signal to the Reference counter 134 (see arrow between block 410 and 214). In this case, the method 400 goes on to perform the procedure indicated by blocks 214 through 220 to adjust Vref and complete the first circuit loop.

In the circuit 100 of FIG. 1 (without the LF data pattern recognizer), the reference counter monitors all the signal pattern amplitude. Hence, Vref in FIG. 1 represents the overall average signal amplitude, and the first circuit loop will adjust the high-frequency data pattern to the overall average of the signal.

In the circuit 300 of FIG. 3 (with the LF data pattern recognizer), the reference counter monitors the signal pattern amplitude for only the designated low-frequency patterns. Hence, Vref in FIG. 3 represents the average signal amplitude for the designated low-frequency patterns, and the first circuit loop will effectively adjust the high-frequency data pattern to the maximum of the signal envelope.

Figure 5:
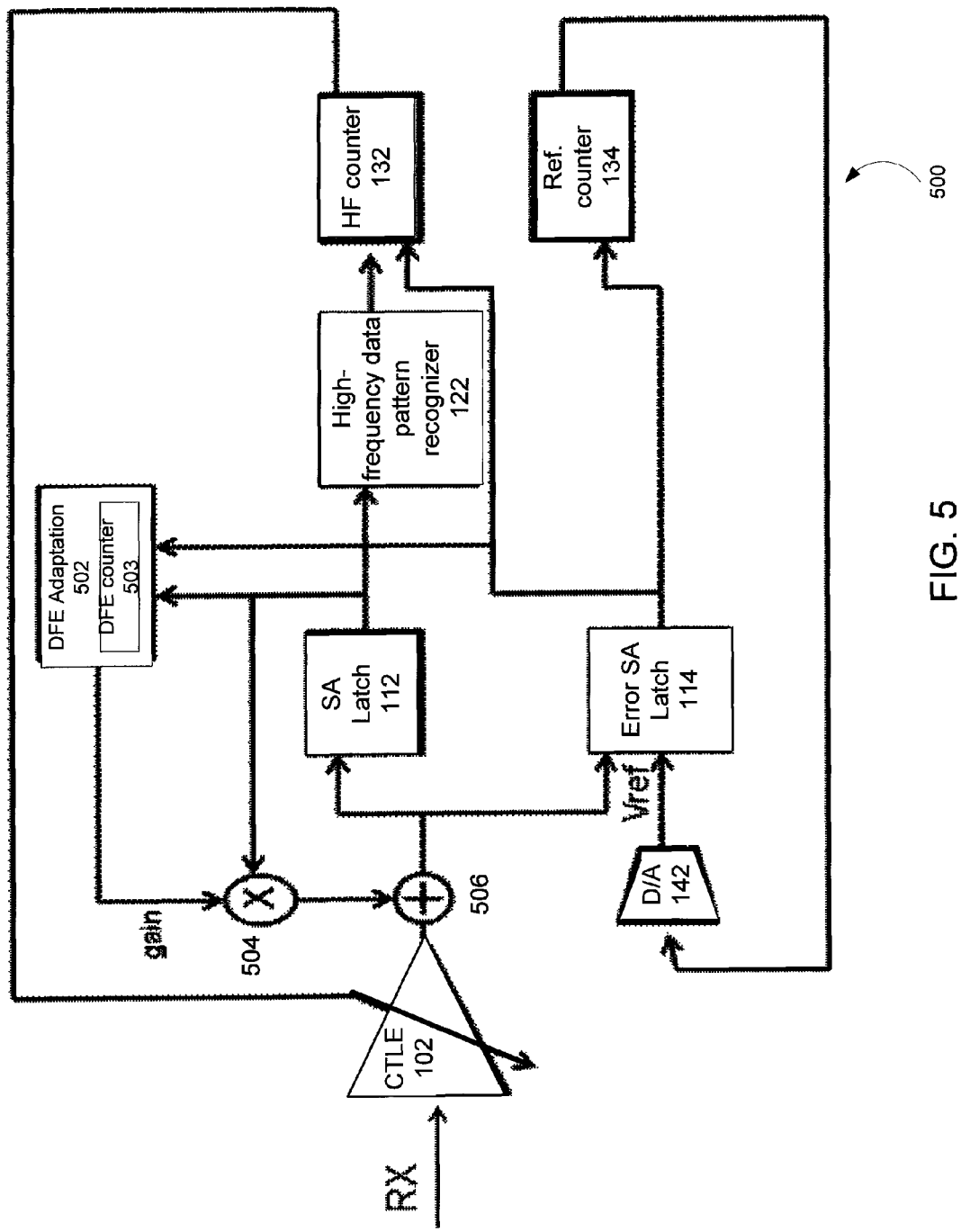
FIG. 5 is a block diagram of a circuit for adaptation of an equalizer which employs both CTLE and DFE in accordance with an embodiment of the invention.

FIG. 5 is a block diagram of a circuit 500 for adaptation of an equalizer which employs both CTLE and DFE in accordance with an embodiment of the invention. Similar to the circuit 100 of FIG. 1, the circuit 500 of FIG. 5 includes the CTLE circuit 102, the SA latch 112, the error SA latch 114, the high-frequency data pattern recognizer 122, the HF counter 132, the Reference counter 134, and the digital-to-analog converter (D/A) 142.

In addition, the circuit 500 of FIG. 5 includes a DFE adaptation circuit 502, a signal multiplier (x) 504, and a signal adder (+) 506. The DFE adaptation circuit 502 receives the digital signal from the SA latch 112 and also receives the error signal from the error SA latch 114. In the DFE adaptation circuit 502, previously-decided bits are fed back with weighted tap coefficients. The DFE adaptation circuit 502 may generate and output a gain signal. As shown, the DFE adaptation circuit 502 may include a DFE counter 503 which averages and tracks the moving direction of the DFE.

The signal multiplier 504 may receive the digital signal from the SA latch 112 and also receives the gain signal from the DFE adaptation circuit 502. The signal multiplier 504 multiplies the equalized signal with the gain signal and provides a feedback signal to the signal adder 506.

The signal adder 506 may receive the equalized signal from the CTLE circuit 102 and also the feedback signal from the signal multiplier 504. The signal adder 506 adds the feedback signal to the equalized signal to generate a feedback equalized signal. The feedback equalized signal is output from the signal adder 506 to the SA latch 112 and the error SA latch 114.

Figure 6:
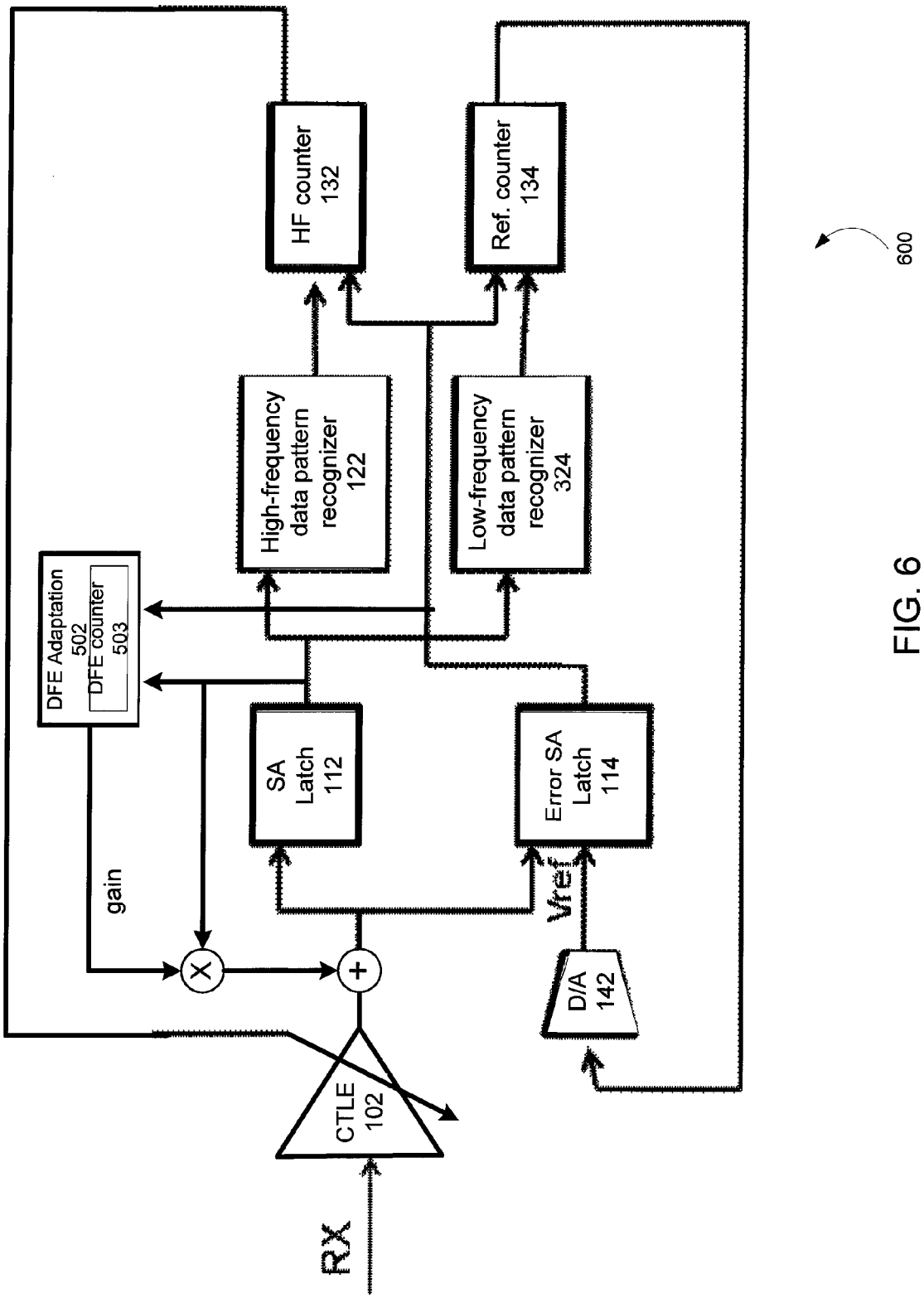
FIG. 6 is a block diagram of an alternate circuit for adaptation of an equalizer which employs both CTLE and DFE in accordance with another embodiment of the invention.

FIG. 6 is a block diagram of an alternate circuit 600 for adaptation of an equalizer which employs both CTLE and DFE in accordance with another embodiment of the invention. Similar to the circuit 300 of FIG. 3, the circuit 600 of FIG. 6 includes the CTLE circuit 102, the SA latch 112, the error SA latch 114, the high-frequency data pattern recognizer 122, the low-frequency data pattern recognizer 324, the HF counter 132, the Reference counter 134, and the digital-to-analog converter (D/A) 142. Similar to the circuit 500 of FIG. 5, the circuit 600 of FIG. 6 includes the DFE adaptation circuit 502, the signal multiplier (x) 504, and the signal adder (+) 506.

Figure 7:
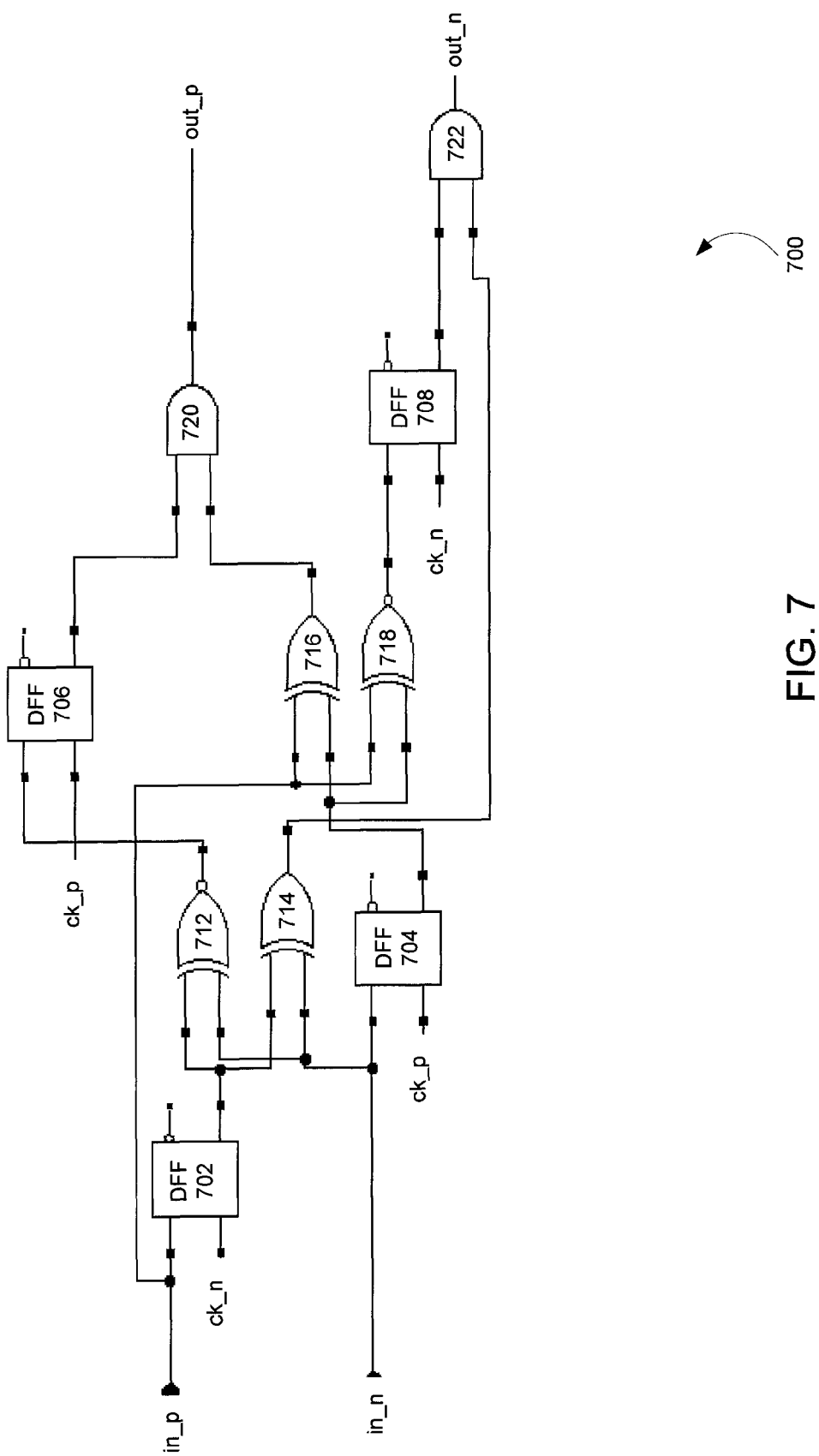
FIG. 7 is a gate-level circuit diagram of a high-frequency data pattern recognizer as configured in accordance with an embodiment of the invention.

FIG. 7 is a gate-level circuit diagram of an example high-frequency data pattern recognizer 700 as configured in accordance with an embodiment of the invention. The high-frequency data pattern recognizer 700 may be used, for example, in the circuit in any of FIG. 1, 3, 5 or 6.

As shown, the inputs to the pattern recognizer circuit 700 include the p-polarity and n-polarity input data signals (in_p and in_n) which may be received from the SA latch 112 and the corresponding p-polarity and n-polarity clock signals (ck_p and ck_n). The outputs from the high-frequency pattern recognizer 700 include the p-polarity and n-polarity output data signals (out_p and out_n).

In the example depicted in FIG. 7, the high-frequency data pattern recognizer 700 includes four D-type flip flops (DFF 702, DFF 704, DFF 706 and DFF 708), two XNOR gates (712 and 718), two XOR gates (714 and 716), and two AND gates (720 and 722). In the example depicted, the flip flops and logic gates are configured to recognize the 110/001 pattern (i.e. the 110 pattern or the 001 pattern). By re-configuring the circuitry, the high-frequency pattern recognizer 700 may be configured to recognize other data patterns.

Figure 8:
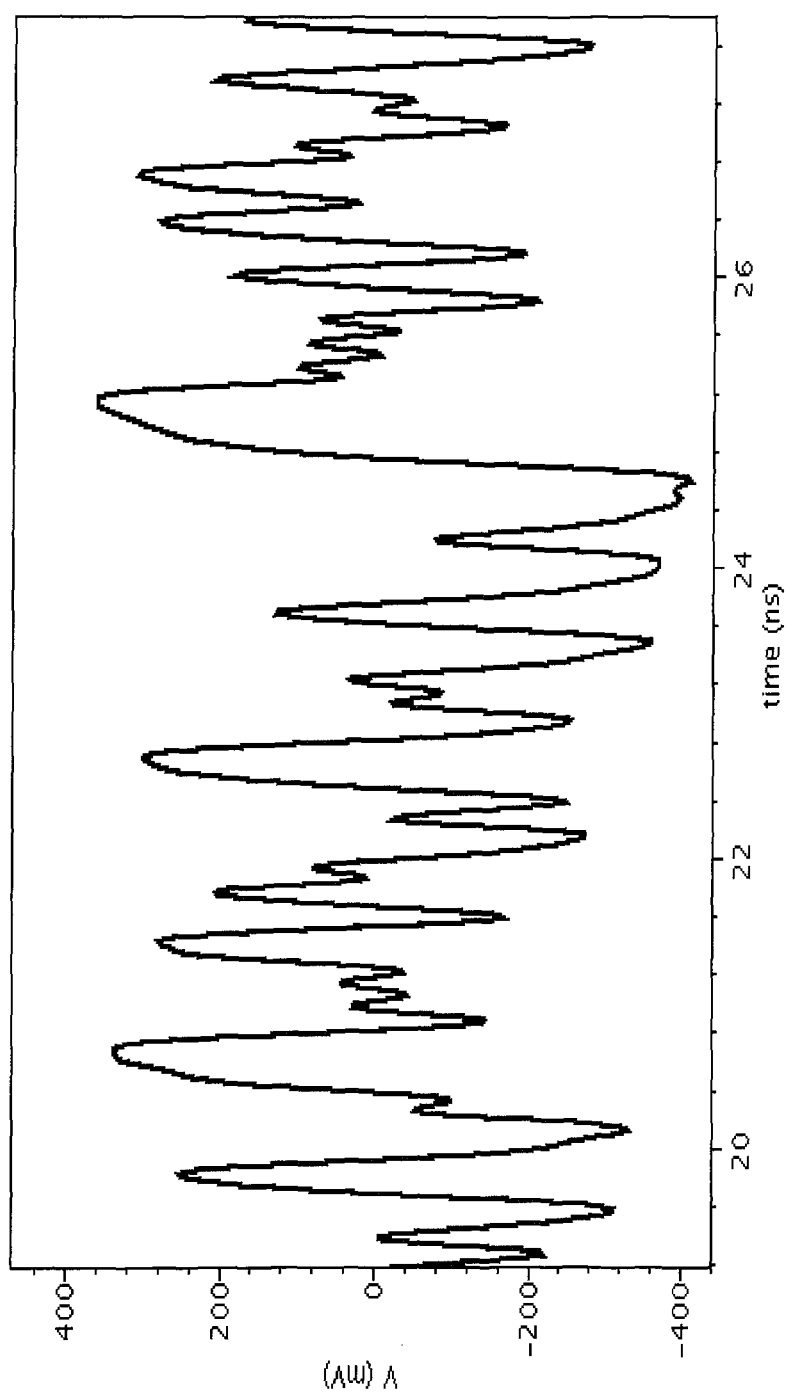
FIG. 8 depicts an example differential signal which may be received prior to equalization in accordance with an embodiment of the invention.

FIG. 8 depicts an example differential signal which may be received prior to equalization in accordance with an embodiment of the invention. As seen in FIG. 8, the low-frequency patterns generally have higher amplitude compared to high-frequency data patterns.

Figure 9:
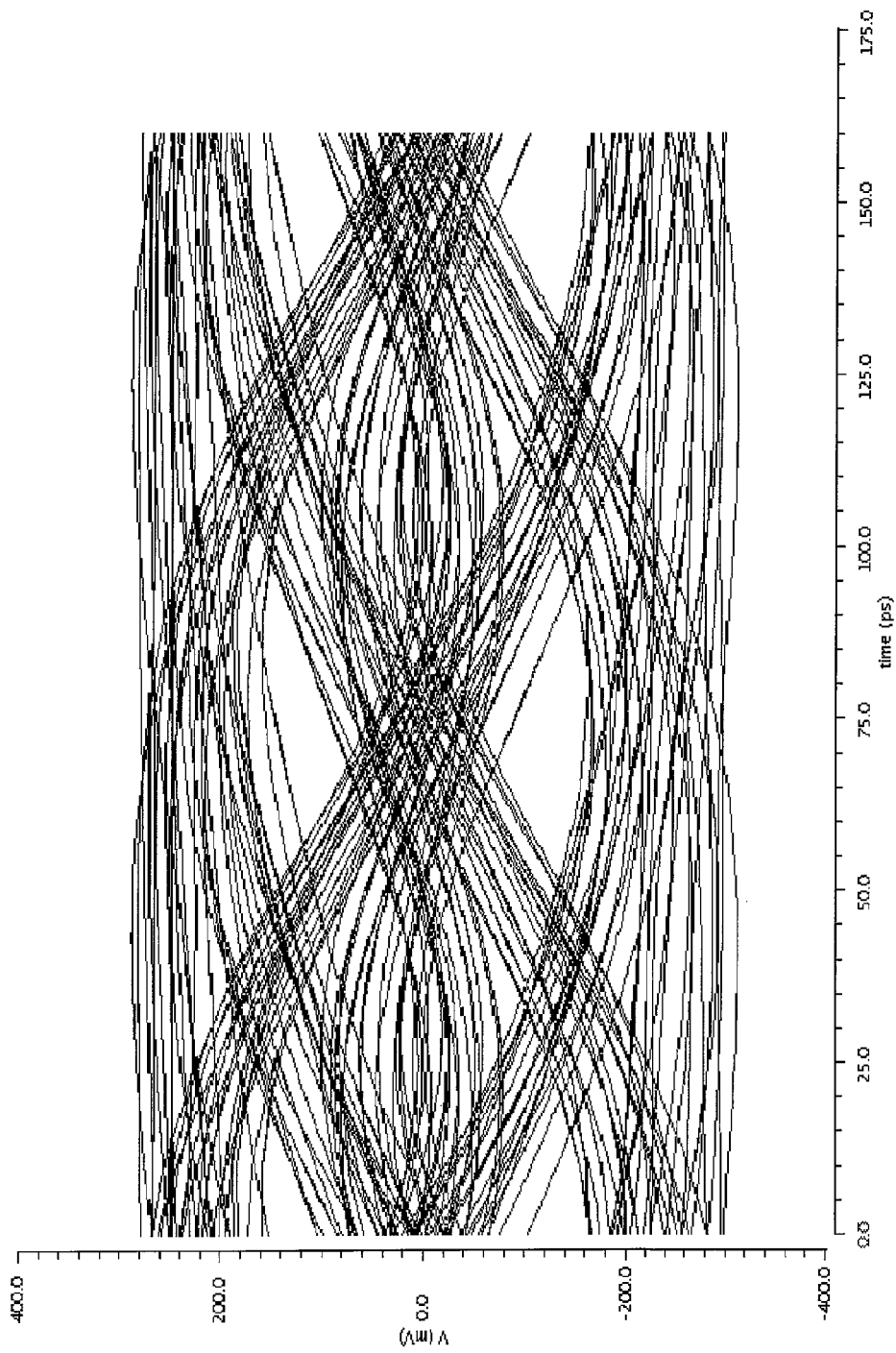
FIG. 9 is an eye diagram of an example received signal after a back plane in accordance with an embodiment of the invention.

FIG. 9 is an eye diagram of an example received signal after a back plane (and before equalization) in accordance with an embodiment of the invention. The received signal in this example is generated based on a pseudo-random binary sequence, in particular based on PRBS-7. As seen, the eye diagram in FIG. 9 indicates that the signal quality is poor.

101/010 and Third Bit

In a first configuration, the high-frequency pattern recognizer is set to recognize 101 and 010 patterns, and the HF counter is set to change depending on the error signal for the third bit of a recognized pattern. In other words, the first configuration recognizes 101/010 patterns and monitors the third bit.

Figure 10:
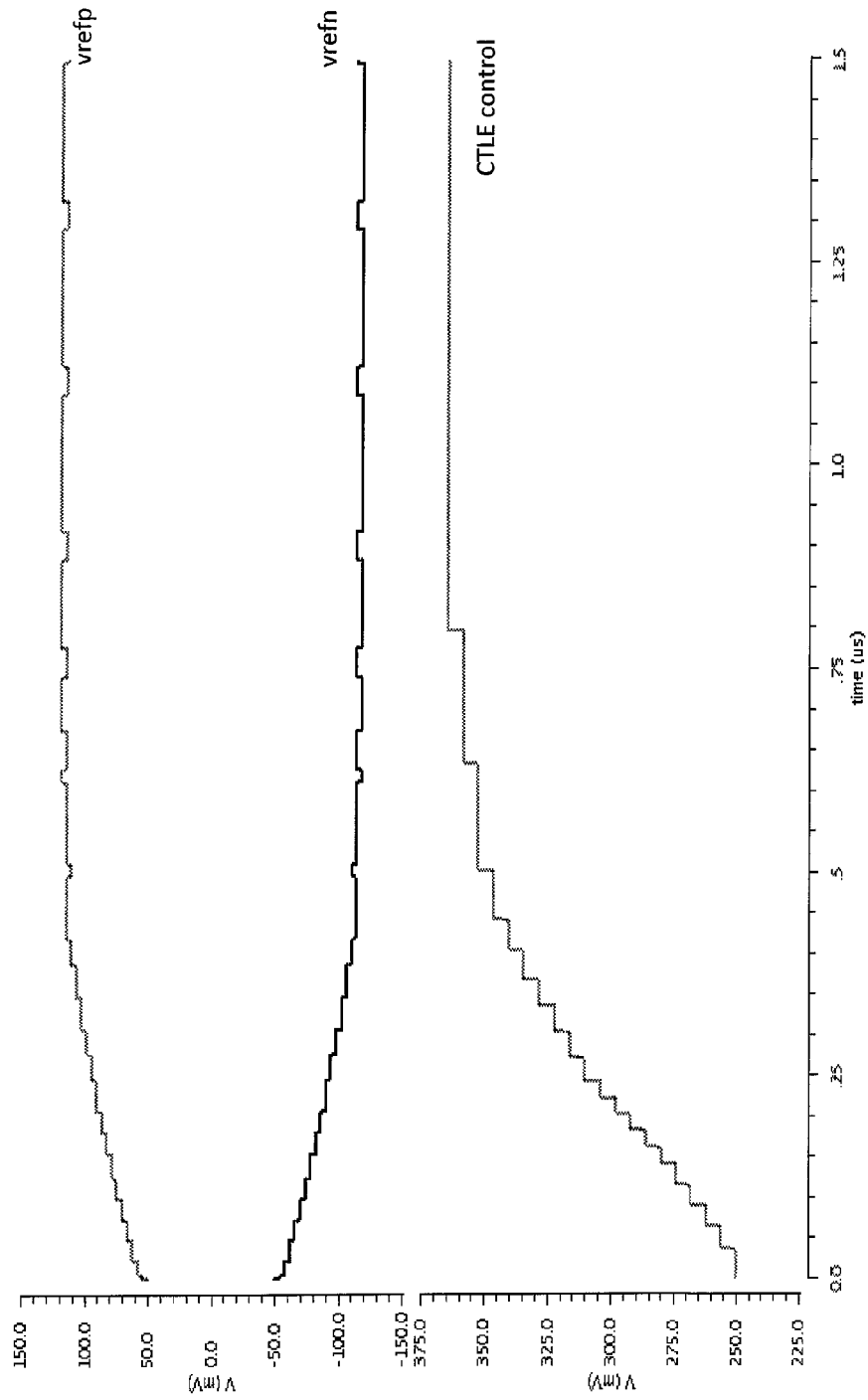
FIG. 10 shows the adaptation settling of the differential reference voltage signal and an equalization control signal using a first configuration in accordance with an embodiment of the invention.

FIG. 10 shows the adaptation settling during a simulation using the first configuration. In particular, the settling of the reference voltage signal (vrefp and vrefn) and the equalization control signal (CTLE control) are shown as a function of time. As seen, the reference voltage signal (the difference between vrefp and vrefn) and the equalization control both increase until reaching a steady state.

Figure 11:
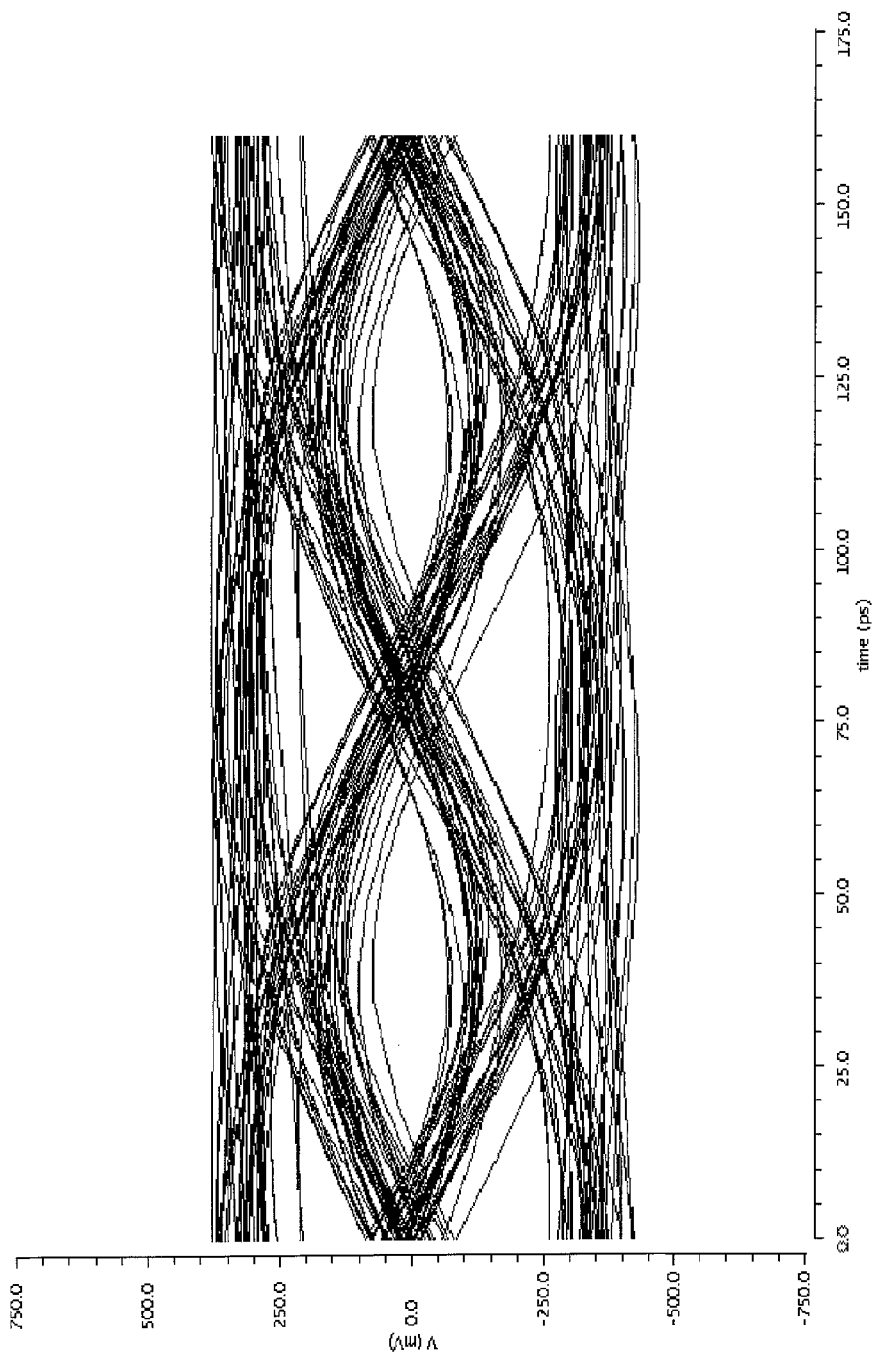
FIG. 11 is an eye diagram of the example received signal after adaptation using the first configuration in accordance with an embodiment of the invention.

FIG. 11 is an eye diagram of the example received signal after adaptation using the first configuration in accordance with an embodiment of the invention. Although the signal quality is improved compared against FIG. 9, the signal is under-equalized using the first configuration.

101/010 and Second Bit

In a second configuration, the high-frequency pattern recognizer is set to recognize 101 and 010 patterns, and the HF counter is set to change depending on the error signal for the second bit of a recognized pattern. In other words, the second configuration recognizes 101/010 patterns and monitors the second bit.

Figure 12:
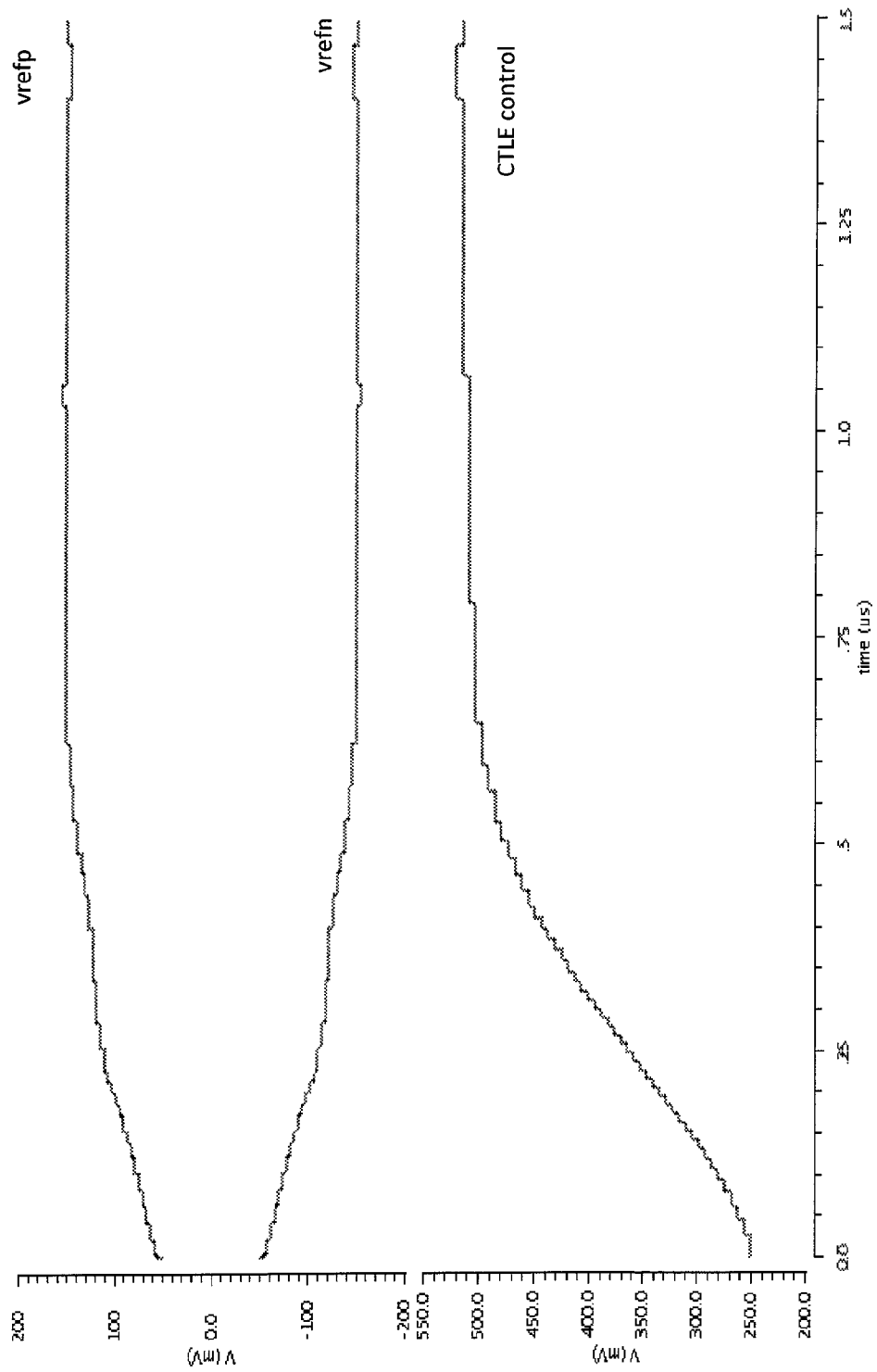
FIG. 12 shows the adaptation settling of the reference voltage signal and an equalization control signal using a second configuration in accordance with an embodiment of the invention.

FIG. 12 shows the adaptation settling during a simulation using the second configuration. In particular, the settling of the reference voltage signal (vrefp and vrefn) and the equalization control signal (CTLE control) are shown as a function of time. As seen, the reference voltage signal (the difference between vrefp and vrefn) and the equalization control both increase until reaching a steady state.

Figure 13:
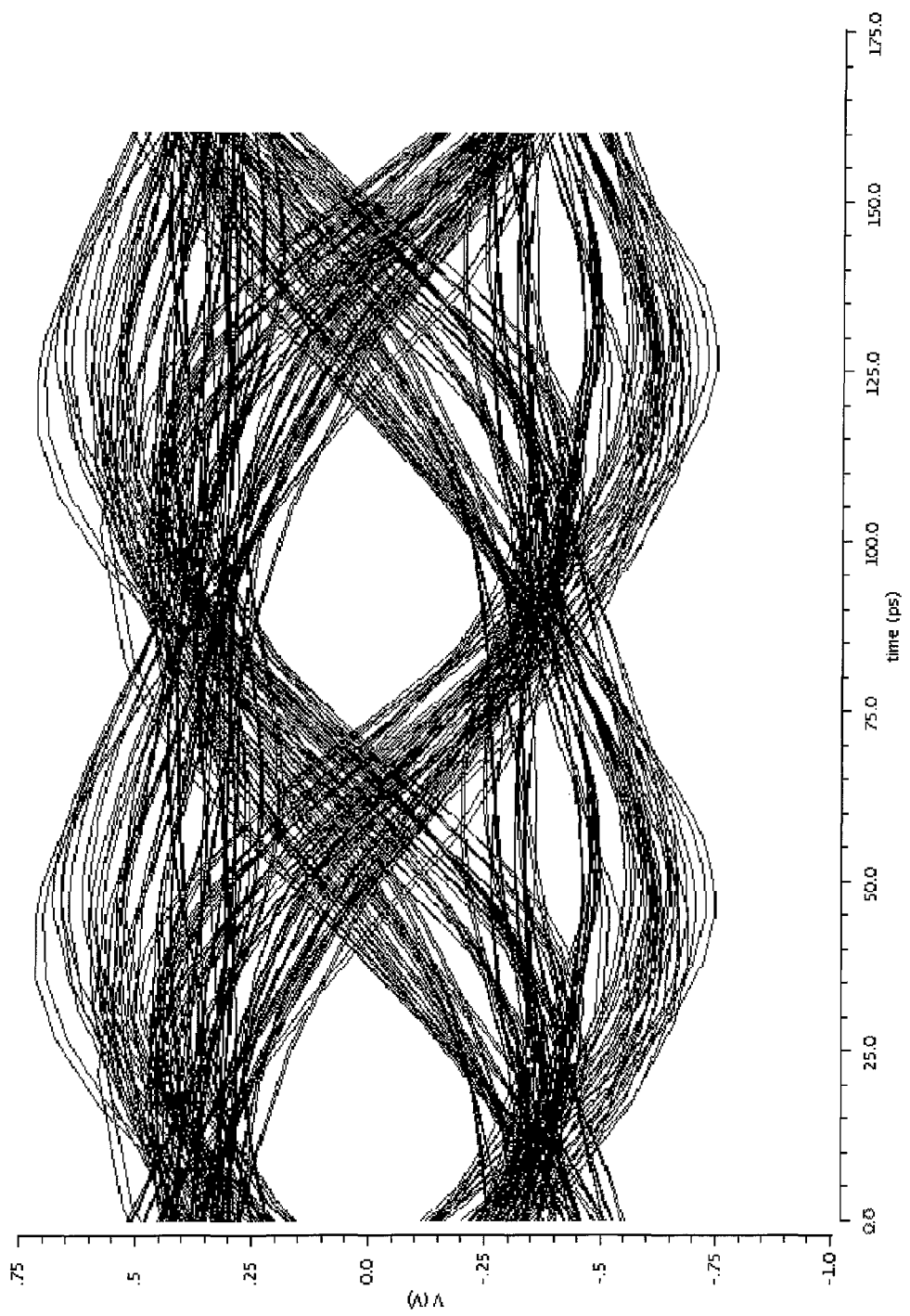
FIG. 13 is an eye diagram of the example received signal after adaptation using the second configuration in accordance with an embodiment of the invention.

FIG. 13 is an eye diagram of the example received signal after adaptation using the second configuration in accordance with an embodiment of the invention. Although the signal quality is improved compared against FIG. 9, the signal is over-equalized using the second configuration.

110/001 and Third Bit

In a third configuration, the high-frequency pattern recognizer is set to recognize 110 and 001 patterns, and the HF counter is set to change depending on the error signal for the third bit of a recognized pattern. In other words, the third configuration recognizes 110/001 patterns and monitors the third bit.

Figure 14:
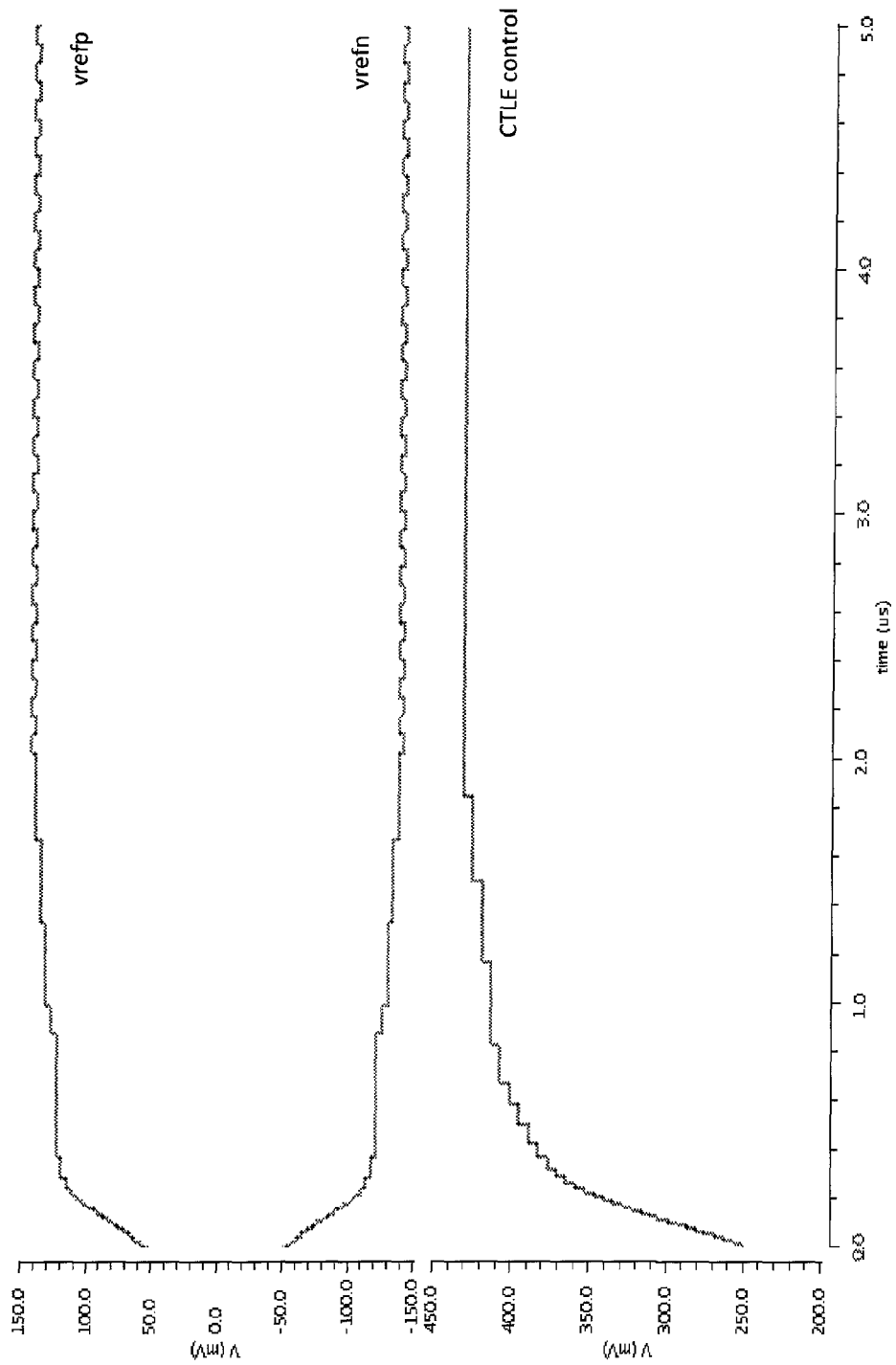
FIG. 14 shows the adaptation settling of the reference voltage signal and an equalization control signal using a third configuration in accordance with an embodiment of the invention.

FIG. 14 shows the adaptation settling during a simulation using the third configuration. In particular, the settling of the reference voltage signal (vrefp and vrefn) and the equalization control signal (CTLE control) are shown as a function of time. As seen, the reference voltage signal (the difference between vrefp and vrefn) and the equalization control both increase until reaching a steady state.

Figure 15:
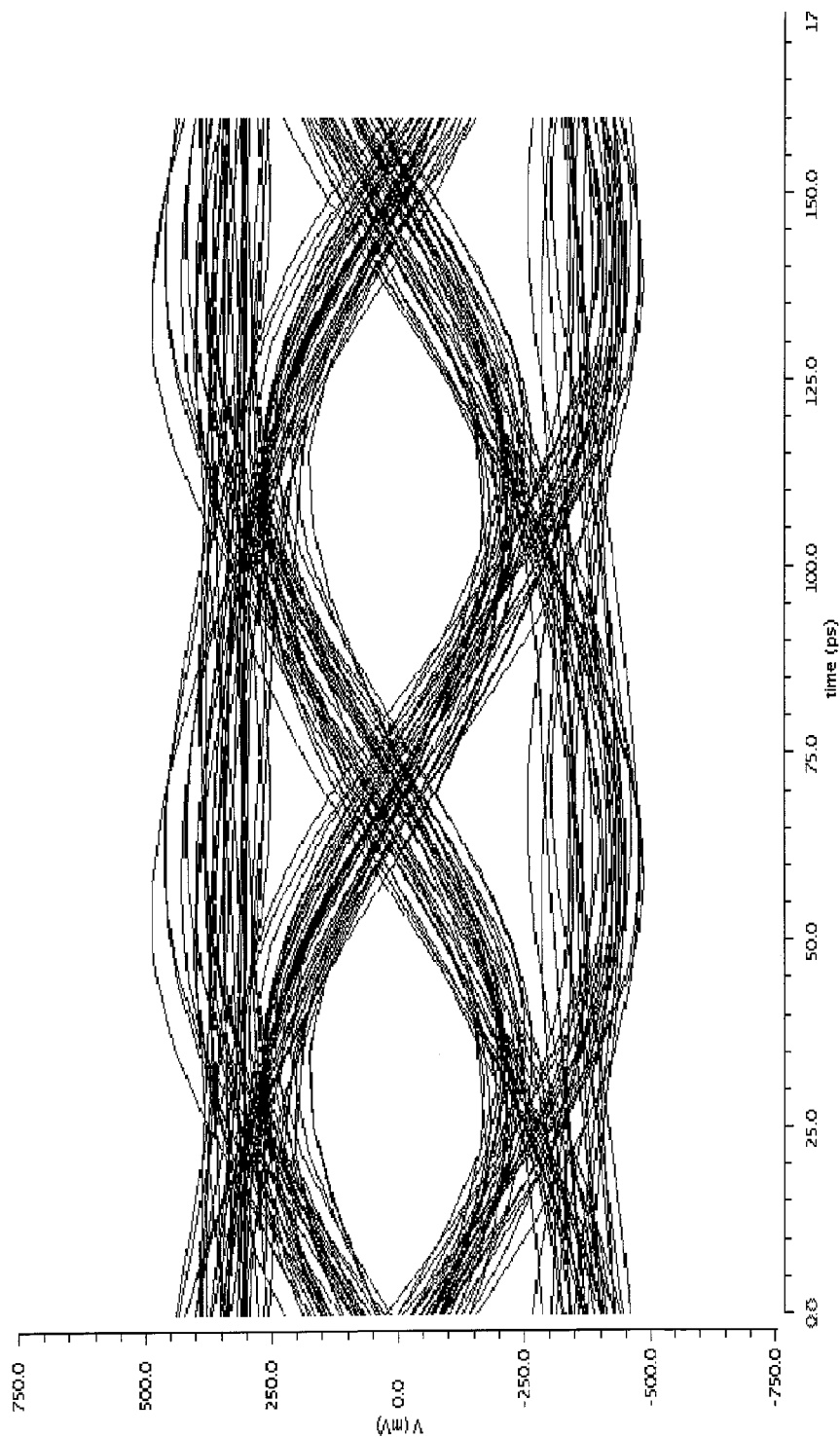
FIG. 15 is an eye diagram of the example received signal after adaptation using the third configuration in accordance with an embodiment of the invention.

FIG. 15 is an eye diagram of the example received signal after adaptation using the third configuration in accordance with an embodiment of the invention. As seen, the signal quality is much improved compared to FIG. 9 and also improved compared to FIGS. 11 and 13. In this configuration, the signal is well equalized.

An explanation of why the third configuration provides improved adaptation results is now discussed. To explain the reason of different data patterns give different adaptation results, let us assume that the received signal at current moment t=0 is:

$$R(t)_{t=0} = D_{-1}*K_{-1} + D_0*K_0 + D_1*K_1 + D_2*K_2 + \Sigma(D_i*K_i) \quad \text{(Eqn. 1)}$$

where $D_{-1}$ is the next bit going to be received, $D_0$ is current bit; $D_i$ is received data which is i bits before. $K_{-1}$ is first precursor weighting; $K_i$ is the $i^{th}$ post cursor weighting. If the communication data is a pseudo-random signal, then the average of $\Sigma(D_i*K_i)$ should be equal to zero.

Consider recognizing the "101/010" data patterns and monitoring the third bit. In this case, the average of the amplitude at the third bit is equal to $$AVG(R(t)_{t=0}) = AVG(D_0^*K_0 + D_1^*K_1 + D_2^*K_2) \quad \text{(Eqn. 2)}$$
$$= K_0 + (-K_1 + K_2)$$

as $$|D_0|, |D_1|, |D_2| = 1 \quad \text{(Eqn. 3)}$$

Without ISI, the average of the received signal amplitude should be equal to $K_0$. Therefore, the adaptation engine tries to reduce $(-K_1+K_2)=0$. This means it only removes the first post cursor ISI (inter-symbol interference) subtracting the second post cursor ISI. This will under equalize the signal as shown in FIG. 11.

Now consider recognizing the "101/010" patterns and monitoring the amplitude of second bit. After the averaging, the received signal amplitude is:

$$AVG(R(t)_{t=0}) = AVG(D_0^*K_0 + D_{-1}^*K_{-1} + D_1^*K_1) \quad \text{(Eqn. 4)}$$
$$= K_0 + (-K_{-1} - K_1) \quad \text{(Eqn. 5)}$$

That means the adaptation engine tries to eliminate the first pre-cursor and the first post-cursor 181. However, the current structure of CTLE cannot reduce pre-cursor 181. This will make the engine over-estimate the first post cursor ISI and cause over-equalization as shown in FIG. 13.

Lastly consider recognizing the "110/001" data patterns and monitoring the third bit. In this case, after averaging, the received signal amplitude is:

$$AVG(R(t)_{t=0}) = AVG(D_0^*K_{-1} + D_1^*K_1 + D_2^*K_2)$$
$$= K_0 + (-K_1 - K_2)$$

So, in this case, the engine will eliminate the first and second post cursor 181. As shown above in FIG. 15, this provides the optimum equalization.

Adaptation of Both CTLE and DFE

In accordance with an embodiment of the invention, CTLE adaptation and DFE adaptation may both work at the same time. Example circuits with both CTLE and DFE adaptation are described above in relation to FIGS. 5 and 6.

By changing the relative bandwidth, we can set whether CTLE or DFE takes a stronger role in the equalization. Setting the relative bandwidths of the CTLE and DFE adaptation loops may be accomplished by setting the counter numbers for the loops. If the DFE counter 503 is set lower or the CTLE counter (i.e. the HF counter 132) is set higher, then the CTLE takes a stronger role in the equalization relative to the DFE. On the other hand, if the DFE counter 503 is set higher or the CTLE counter (i.e. the HF counter 132) is set lower, then the CTLE takes a weaker role in the equalization relative to the DFE. This is because the counters act as a loop pass filter in the digital adaptation loops. Reducing the counter value causes an increase in the loop bandwidth.

DFE Counter set as 256; CTLE Counter Set as 32

In a first CTLE/DFE configuration of the circuit 500 depicted in FIG. 5, the DFE counter 503 may be set as 256, and the CTLE counter (i.e. the HF counter 132) may be set as 32. Meanwhile, the CTLE adaptation circuit may be configured with the high-frequency pattern recognizer set to recognize 110 and 001 patterns and the HF counter 132 set to change depending on the error signal for the third bit of a recognized pattern.

Figure 16:
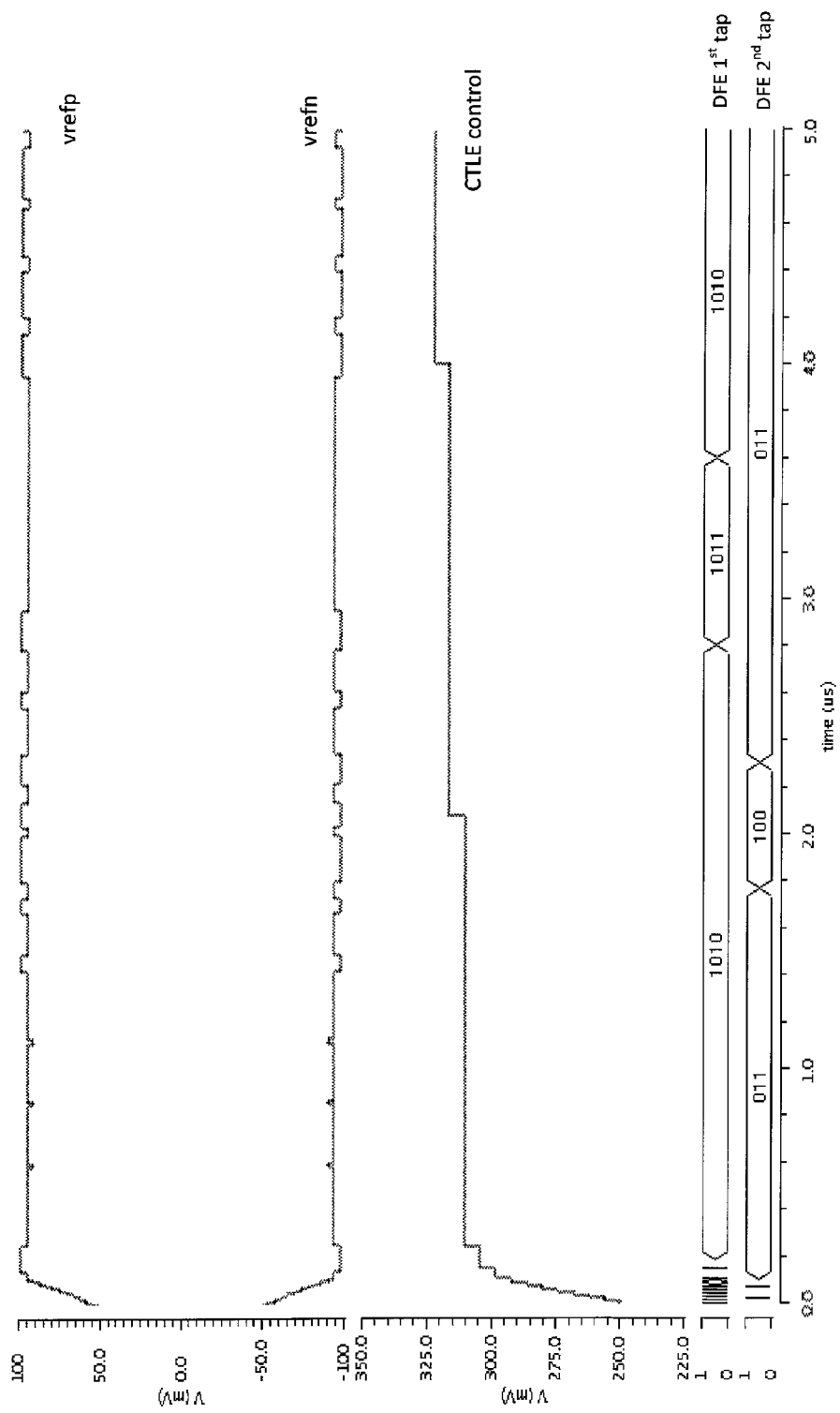
FIG. 16 shows the adaptation settling of the reference voltage signal, an equalization control signal, and DFE tap values using a first CTLE/DFE configuration in accordance with an embodiment of the invention.
Figure 17:
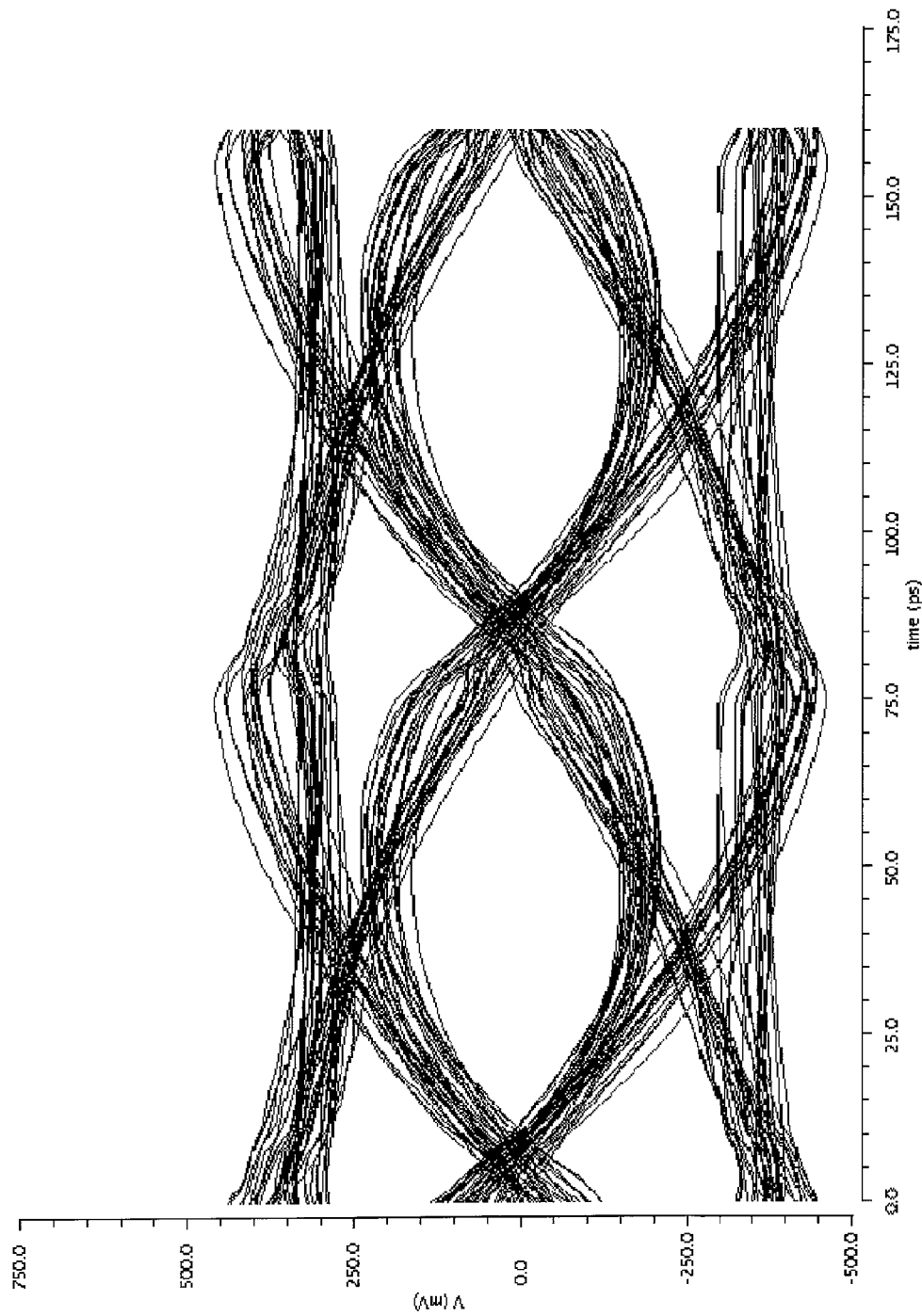
FIG. 17 is an eye diagram of the example received signal after adaptation using the first CTLE/DFE configuration in accordance with an embodiment of the invention.

FIG. 16 shows the adaptation settling during a simulation using the first CTLE/DFE configuration in accordance with an embodiment of the invention. In particular, the settling of the reference voltage signal (vrefp and vrefn), the equalization control signal (CTLE control), and the DFE tap values are shown as a function of time. As seen, the reference voltage signal (the difference between vrefp and vrefn), the equalization control, and the DFE tap values each settle over time to a steady state. In this instance, the DFE first tap is shown as settling to binary 1010, and the DFE second tap value is shown as settling to binary 011. An eye diagram of an example received signal after adaptation using the first CTLE/DFE configuration is shown in FIG. 17.

DFE Counter Set as 1024; CTLE Counter Set as 32

In a second CTLE/DFE configuration of the circuit 500 depicted in FIG. 5, the DFE counter 503 may be set as 1024, and the CTLE counter (i.e. the HF counter 132) may be set as 32. Meanwhile, the CTLE adaptation circuit may be configured with the high-frequency pattern recognizer set to recognize 110 and 001 patterns and the HF counter 132 set to change depending on the error signal for the third bit of a recognized pattern.

Figure 18:
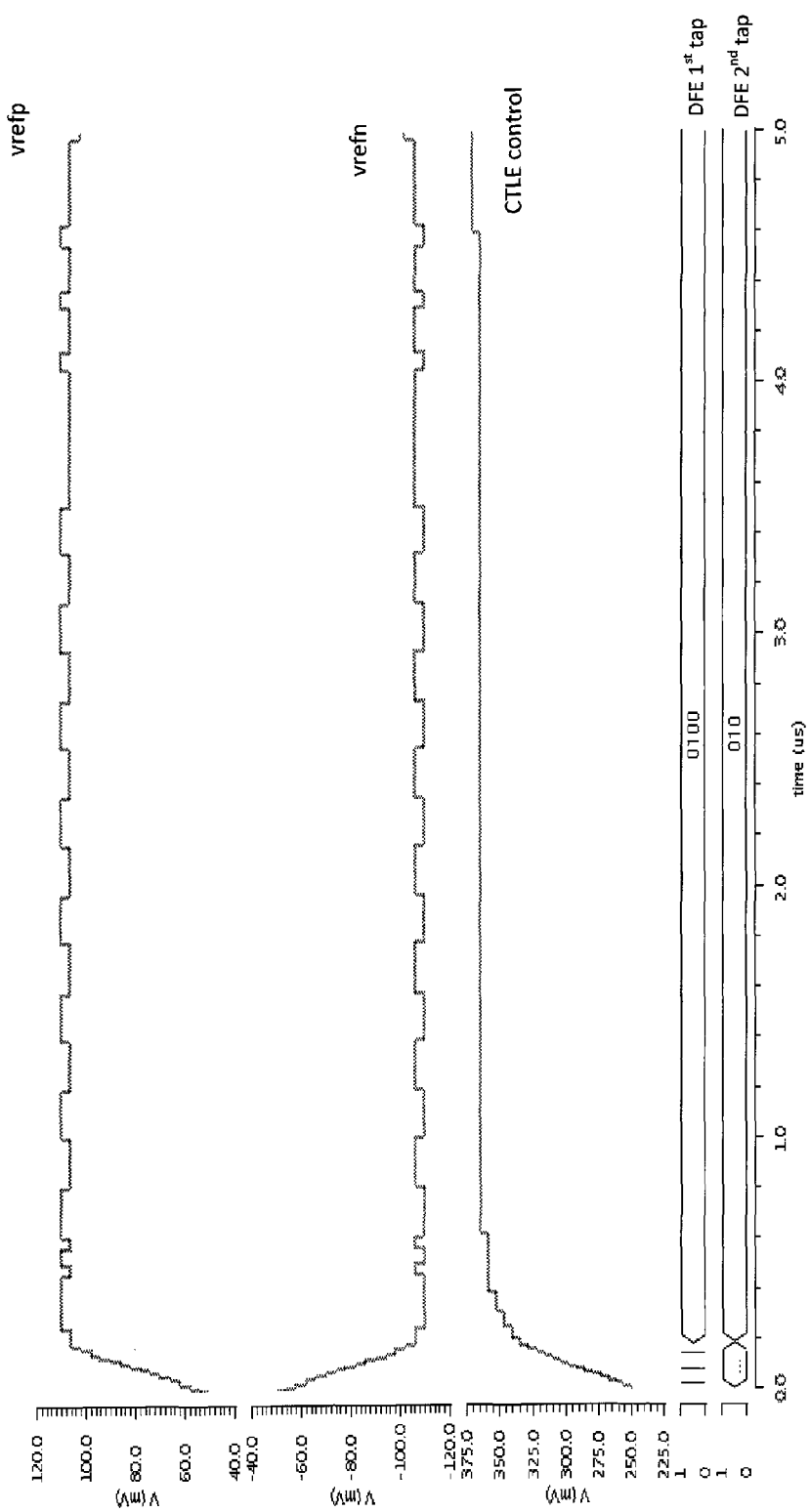
FIG. 18 shows the adaptation settling of the reference voltage signal, an equalization control signal, and DFE tap values using a second CTLE/DFE configuration in accordance with an embodiment of the invention.
Figure 19:
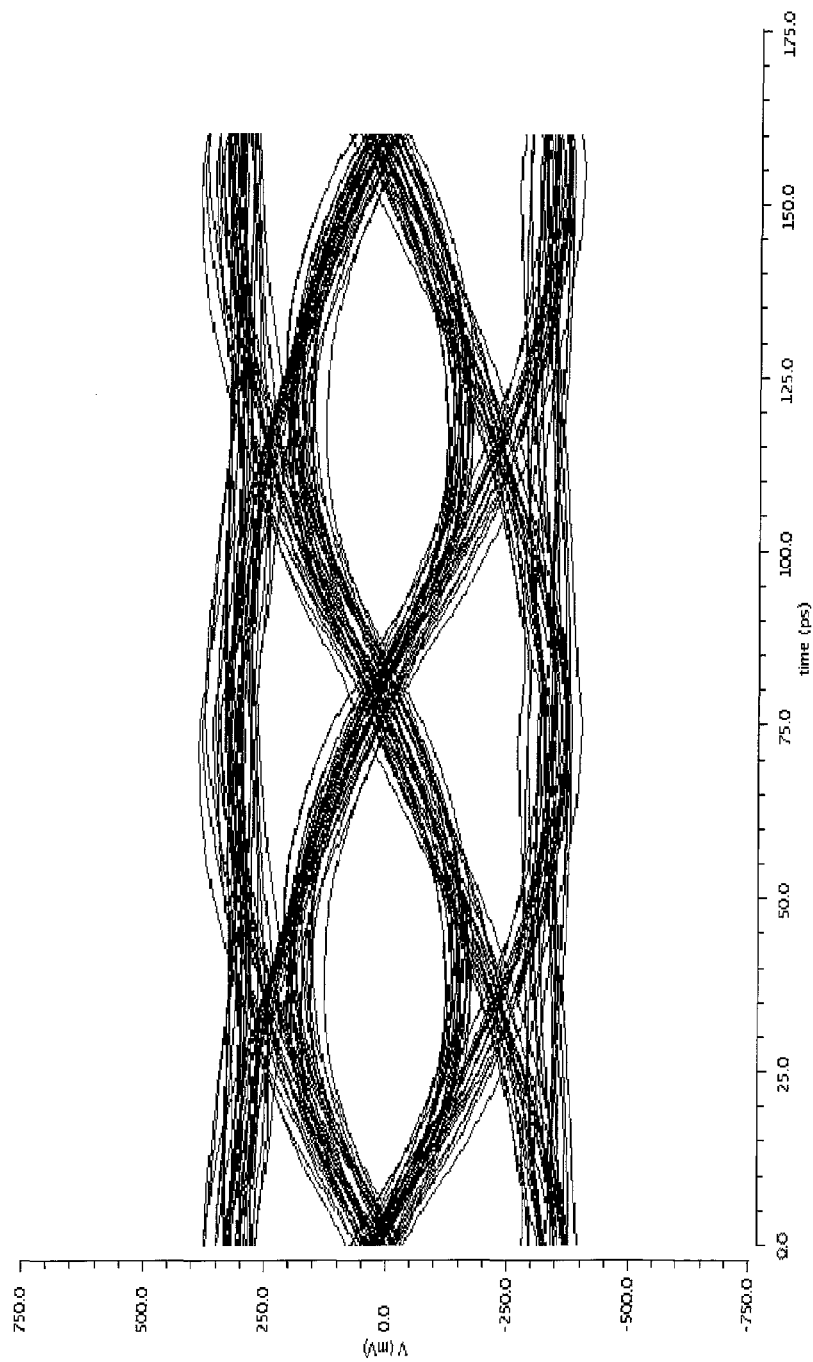
FIG. 19 is an eye diagram of the example received signal after adaptation using the second CTLE/DFE configuration in accordance with an embodiment of the invention.

FIG. 18 shows the time evolution of the reference voltage signal, an equalization control signal, and DFE tap values using a second CTLE/DFE configuration in accordance with an embodiment of the invention. In particular, the settling of the reference voltage signal (vrefp and vrefn), the equalization control signal (CTLE control), and the DFE tap values are shown as a function of time. As seen, the reference voltage signal (the difference between vrefp and vrefn), the equalization control, and the DFE tap values each settle over time to a steady state. In this instance, the DFE first tap is shown as settling to binary 0100, and the DFE second tap value is shown as settling to binary 010. An eye diagram of an example received signal after adaptation using the second CTLE/DFE configuration is shown in FIG. 19.

Example FPGA and Digital System

Figure 20:
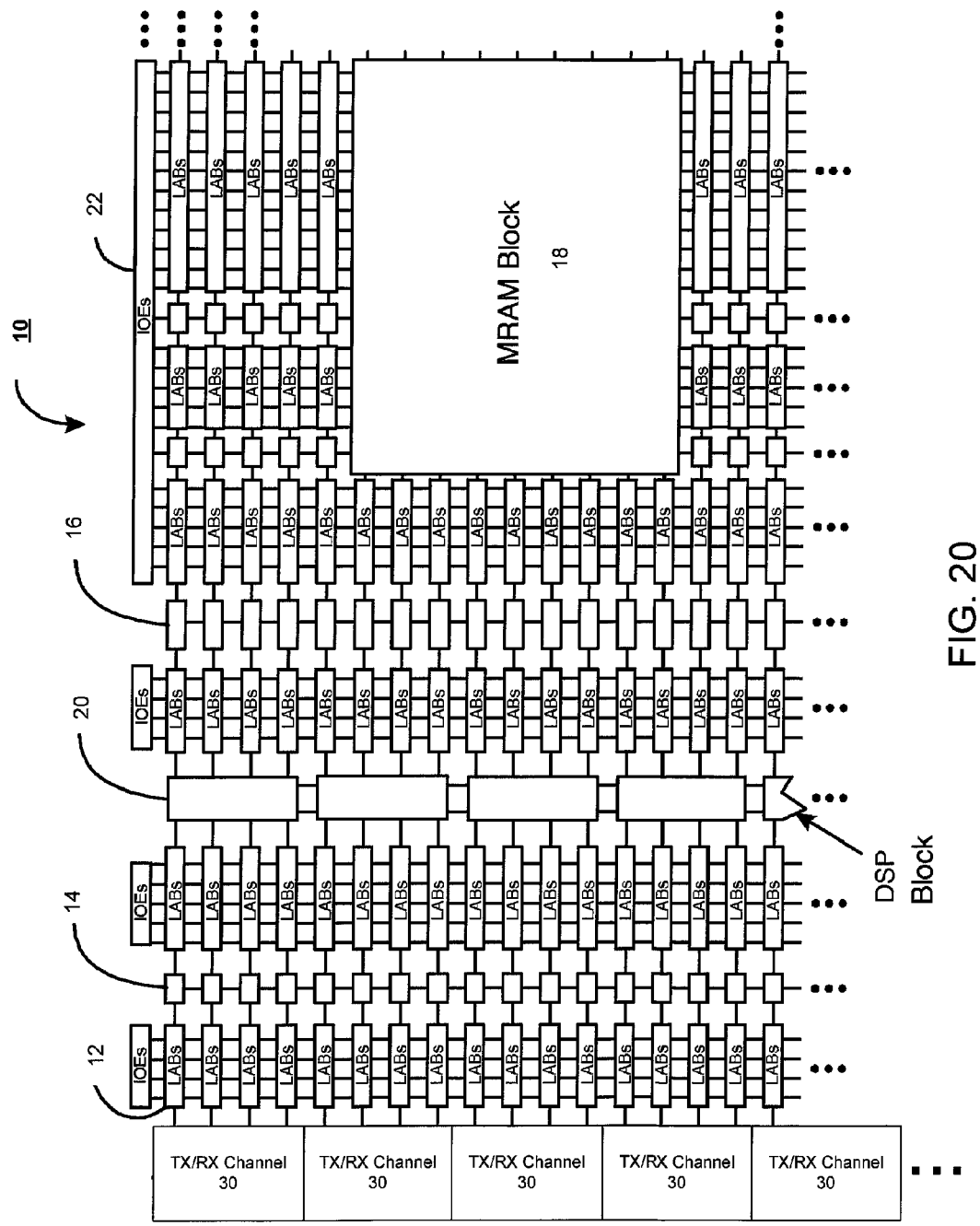
FIG. 20 is a simplified partial block diagram of a field programmable gate array (FPGA) that may include aspects of the present invention.

FIG. 20 is a simplified partial block diagram of a field programmable gate array (FPGA) 10 that may include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the receiver equalization circuitry described herein.

It is to be understood that FPGA 10 is described herein for illustrative purposes only and that the present invention may be implemented in many different types of PLDs, FPGAs, and ASICs. Furthermore, the present invention may be implemented in a system that has a FPGA as one of several components.

Figure 21:
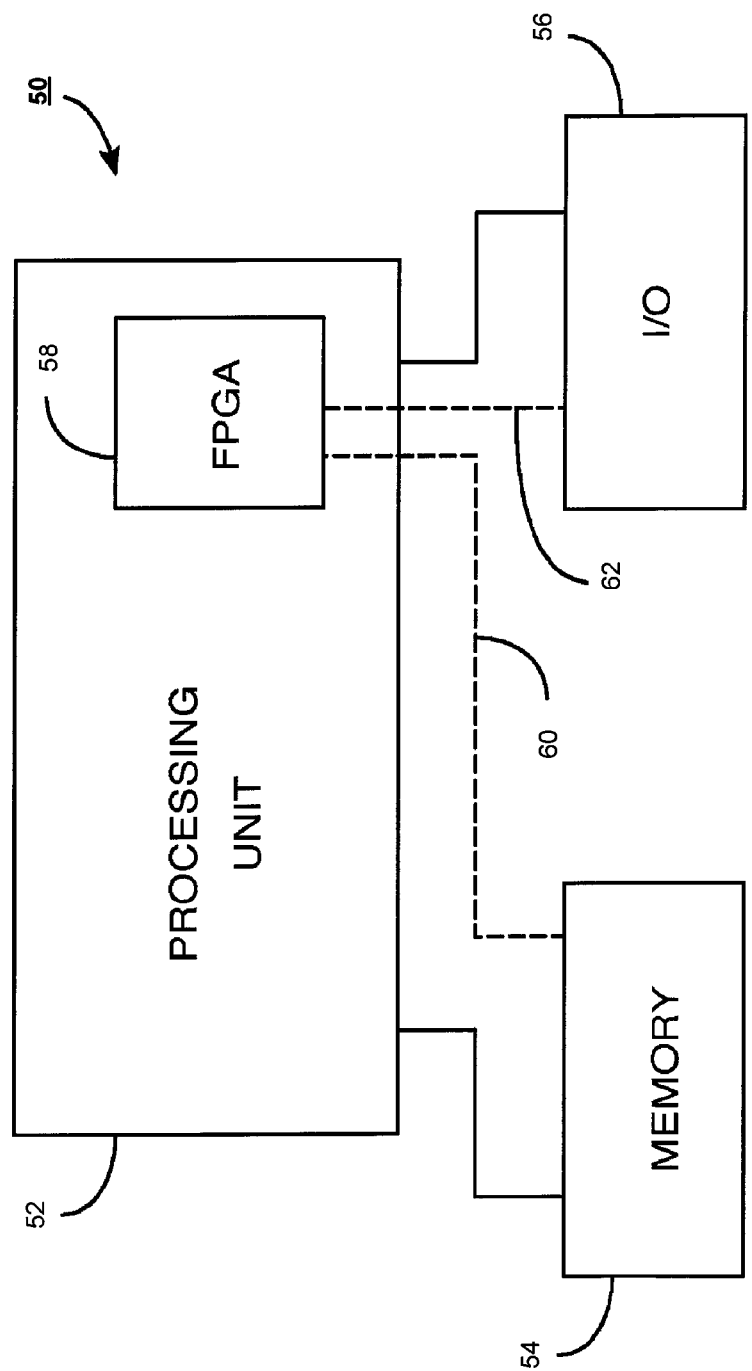
FIG. 21 is a block diagram of an exemplary digital system that may utilize techniques of the present invention.

FIG. 21 shows a block diagram of an exemplary digital system 50 that may utilize techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An equalizer circuit for a data link, the equalizer circuit comprising:
a continuous-time linear equalizer for receiving a received signal and outputting an equalized signal;
a first circuit loop comprising an error sense-amplifier latch which receives the equalized signal and outputs an error signal, wherein the first circuit loop determines a first average signal amplitude, wherein the first average signal amplitude comprises an average signal amplitude of the equalized signal;
a second circuit loop comprising a data sense-amplifier latch which receives the equalized signal and outputs a data signal, wherein the second circuit loop determines a second average signal amplitude, and wherein the second average signal amplitude comprises an average signal amplitude of a high-frequency portion of the equalized signal;
a decision feedback equalization (DFE) adaptation circuit which receives the data signal from the data sense-amplifier latch and the error signal from the error sense-amplifier latch and which outputs a DFE gain signal;
a signal multiplier which multiplies the data signal from the data sense-amplifier latch with the DFE gain signal to generate an adjustment signal; and
a signal adder which adds the adjustment signal to the equalized signal from the continuous-time linear equalizer.

2. The equalizer circuit of claim 1, wherein the first circuit loop comprises:
the error sense-amplifier latch which compares amplitudes between the equalized signal to a reference voltage signal and which outputs the error signal in a positive difference state if the amplitude of the equalized signal is larger than the amplitude of the reference voltage signal and otherwise outputs the error signal in a negative difference state;
a first counter which outputs a first digital count that is incremented if the error signal is in the positive difference state and decremented if the error signal is in the negative difference state; and
a digital-to-analog converter which converts the first digital count to the reference voltage signal.

3. The equalizer circuit of claim 1, wherein the second circuit loop comprises:
the data sense-amplifier latch which latches the equalized signal using a clock signal and outputs the data signal;
a data pattern recognizer which receives the data signal and asserts a counter enable signal when a high-frequency data pattern is recognized;
a second counter which outputs a second digital count and which, when the counter enable signal is asserted, is decremented if the error signal is in the positive state and incremented if the error signal is in the negative state; and
a control circuit which receives the second digital count and uses the second digital count to control a high-frequency gain of the continuous-time linear equalizer.

4. The equalizer circuit of claim 3, wherein the high-frequency data pattern comprises a data pattern from a group of data patterns consisting of 110 and 001, and wherein the error sense-amplifier latch compares the amplitudes between the equalized signal for a third bit of the data pattern and the reference voltage signal in determining the error signal.

5. An equalizer circuit for a data link, the equalizer circuit comprising:
a continuous-time linear equalizer for receiving a received signal and outputting an equalized signal;
a data sense-amplifier latch which latches the equalized signal using a clock signal and outputs a data signal;
an error sense-amplifier latch which compares amplitudes between the equalized signal to a reference voltage signal and which outputs an error signal in a positive difference state if the amplitude of the equalized signal is larger than the amplitude of the reference voltage signal and otherwise outputs the error signal in a negative difference state;
a first control circuit which receives the equalized signal and determines a first average signal amplitude to control the reference voltage signal, wherein the first average signal amplitude comprises an average signal amplitude of a first set of data patterns in the equalized signal;
a second control circuit which receives the equalized signal and determines a second average signal amplitude to control the continuous-time linear equalizer, wherein the second average signal amplitude comprises an average signal amplitude of a second set of data patterns in the equalized signal;
a decision feedback equalization (DFE) adaptation circuit which receives the data signal from the data sense-amplifier latch and the error signal from the error sense-amplifier latch and which outputs a DFE gain signal;
a signal multiplier which multiplies the data signal from the data sense-amplifier latch with the DFE gain signal to generate an adjustment signal; and
a signal adder which adds the adjustment signal to the equalized signal from the continuous-time linear equalizer.

6. The equalizer circuit of claim 5, wherein the first control circuit comprises:
a first data pattern recognizer which receives the data signal and asserts a first counter enable signal when a data pattern of the first set of data patterns is recognized;
a first counter which outputs a first digital count and which, when the first counter enable signal is asserted, is incremented if the error signal is in the positive difference state and decremented if the error signal is in the negative difference state; and
a digital-to-analog converter which converts the first digital count to the reference voltage signal.

7. The equalizer circuit of claim 6, wherein the second circuit circuit comprises:
a second data pattern recognizer which receives the data signal and asserts a second counter enable signal when a data pattern of the second set of data patterns is recognized;
a second counter which outputs a second digital count and which, when the second counter enable signal is asserted, is decremented if the error signal is in the positive difference state and incremented if the error signal is in the negative difference state; and
a control circuit which receives the second digital count and uses the second digital count to control a continuous-time linear equalizer.

8. The equalizer circuit of claim 7, wherein the first set of data patterns comprises low-frequency data patterns.

9. The equalizer circuit of claim 7, wherein the second set of data patterns comprises high-frequency data patterns, and wherein the second digital count is used to control a high-frequency gain of the continuous-time linear equalizer.

10. The equalizer circuit of claim 9, wherein the second set of data patterns comprises a 110 data pattern and a 001 data pattern, and wherein the error sense-amplifier latch compares the amplitudes between the equalized signal for a third bit of the data pattern and the reference voltage signal in determining the error signal.

11. A method of receiver equalization, the method comprising:

receiving a received signal by a continuous-time linear equalizer which outputs an equalized signal;

latching the equalized signal by a data sense-amplifier latch which outputs a data signal;

comparing amplitudes between the equalized signal to a reference voltage signal by an error sense-amplifier latch which outputs an error signal in a positive difference state if the amplitude of the equalized signal is larger than the amplitude of the reference voltage signal and otherwise outputs the error signal in a negative difference state;

determining a first average signal amplitude to control the reference voltage signal, wherein the first average signal amplitude comprises an average signal amplitude of a first set of data patterns in the equalized signal;

determining a second average signal amplitude to control the continuous-time linear equalizer, wherein the second average signal amplitude comprises an average signal amplitude of a second set of data patterns in the equalized signal;

receiving the data signal and the error signal by a decision feedback equalization (DFE) adaptation circuit;

generating a DFE gain signal by the DFE adaptation circuit based on the data signal and the error signal;

multiplying the data signal from the data sense-amplifier latch with the DFE gain signal to generate an adjustment signal; and adding the adjustment signal to the equalized signal from the continuous-time linear equalizer.

12. The method of claim 11, wherein determining the first average signal amplitude comprises:

asserting a first counter enable signal when a data pattern of the first set of data patterns is recognized;

incrementing a first counter which outputs a first digital count when the first counter enable signal is asserted and the error signal is in the positive difference state;

decrementing the first counter when the first counter enable signal is asserted and the error signal is in the negative difference state; and converting the first digital count to the reference voltage signal.

13. The method of claim 12, wherein determining the second average signal amplitude comprises:

asserting a second counter enable signal when a data pattern of the second set of data patterns is recognized;

decrementing a second counter which outputs a second digital count when the second counter enable signal is asserted if the error signal is in the positive difference state;

incrementing the second counter when the second counter enable signal is asserted if the error signal is in the negative difference state; and using the second digital count to control a continuous-time linear equalizer.

14. The method of claim 13, wherein the first set of data patterns comprises low-frequency data patterns.

15. The method of claim 13, wherein the second set of data patterns comprises high-frequency data patterns, and wherein the second digital count is used to control a high-frequency gain of the continuous-time linear equalizer.

16. The method of claim 15, wherein the second set of data patterns comprises a 110 data pattern and a 001 data pattern, and wherein the error sense-amplifier latch compares the amplitudes between the equalized signal for a third bit of the data pattern and the reference voltage signal in determining the error signal.

\* \* \* \* \*